(12) United States Patent
Ito et al.

(10) Patent No.: US 7,317,581 B2
(45) Date of Patent: Jan. 8, 2008

(54) FISHEYE LENS SYSTEM AND A FISHEYE ZOOM LENS SYSTEM

(75) Inventors: Takayuki Ito, Saitama (JP); Jun Hirakawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/467,668

(22) Filed: Aug. 28, 2006

(65) Prior Publication Data
US 2007/0047096 A1    Mar. 1, 2007

(30) Foreign Application Priority Data
Aug. 30, 2005   (JP)   ............... 2005-250023
Jun. 12, 2006   (JP)   ............... 2006-161774

(51) Int. Cl.
*G02B 15/14*   (2006.01)
*G02B 13/04*   (2006.01)

(52) U.S. Cl. ............... 359/681; 359/680; 359/750; 359/751

(58) Field of Classification Search ........ 351/680–682, 351/749–753
See application file for complete search history.

(56) References Cited

U.S. PATENT DOCUMENTS 5,579,169  A  * 11/1996  Mouri ................ 359/682
5,684,643  A    11/1997  Enomoto et al.
5,724,193  A     3/1998  Hirakawa
5,724,195  A     3/1998  Enomoto et al.
6,560,042  B2    5/2003  Murata et al.
6,603,610  B2    8/2003  Murata et al.
7,116,499  B2   10/2006  Hirakawa
2004/0051958  A1 *  3/2004  Yoneyama ........... 359/681
2006/0001985  A1    1/2006  Tada et al.
2006/0126192  A1    6/2006  Ryu et al.

FOREIGN PATENT DOCUMENTS

JP        8-171053        7/1996

OTHER PUBLICATIONS

English Language Abstract of JP 8-171053.

* cited by examiner

*Primary Examiner*—Scott J. Sugarman
(74) *Attorney, Agent, or Firm*—Greenblum & Bernstein, P.L.C.

(57) ABSTRACT

A fisheye lens system includes a negative first lens group and a positive second lens group, which are defined with respect to a maximum air-distance between lens elements constituting the fisheye lens system. The negative first lens group includes a first negative meniscus lens element having the convex surface facing toward the object, a second negative meniscus lens element having the convex surface facing toward the object, and a negative third lens element.

7 Claims, 21 Drawing Sheets

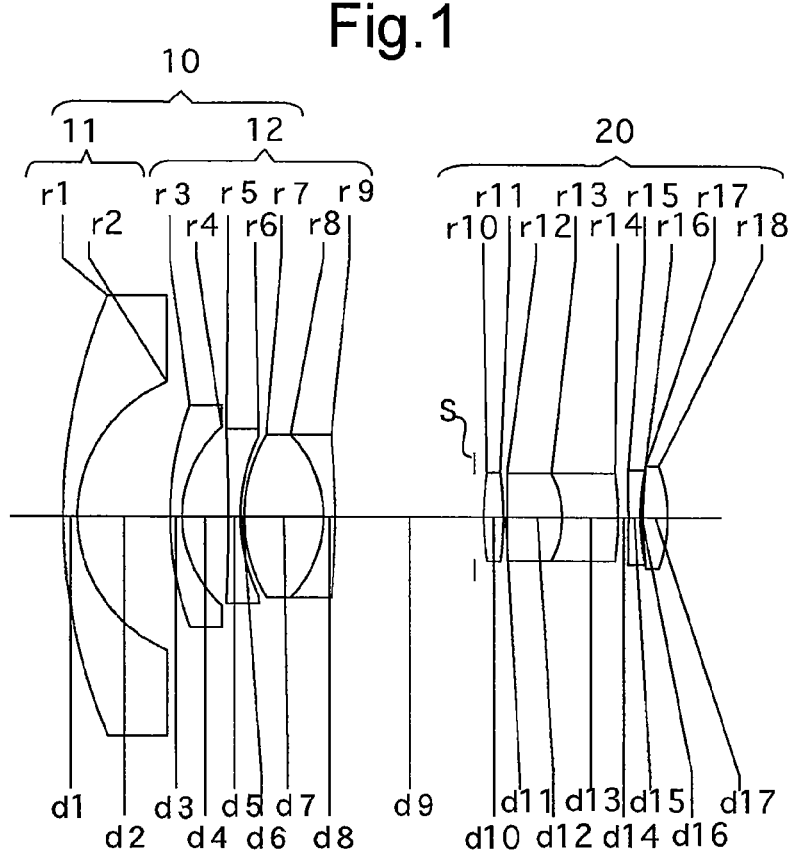
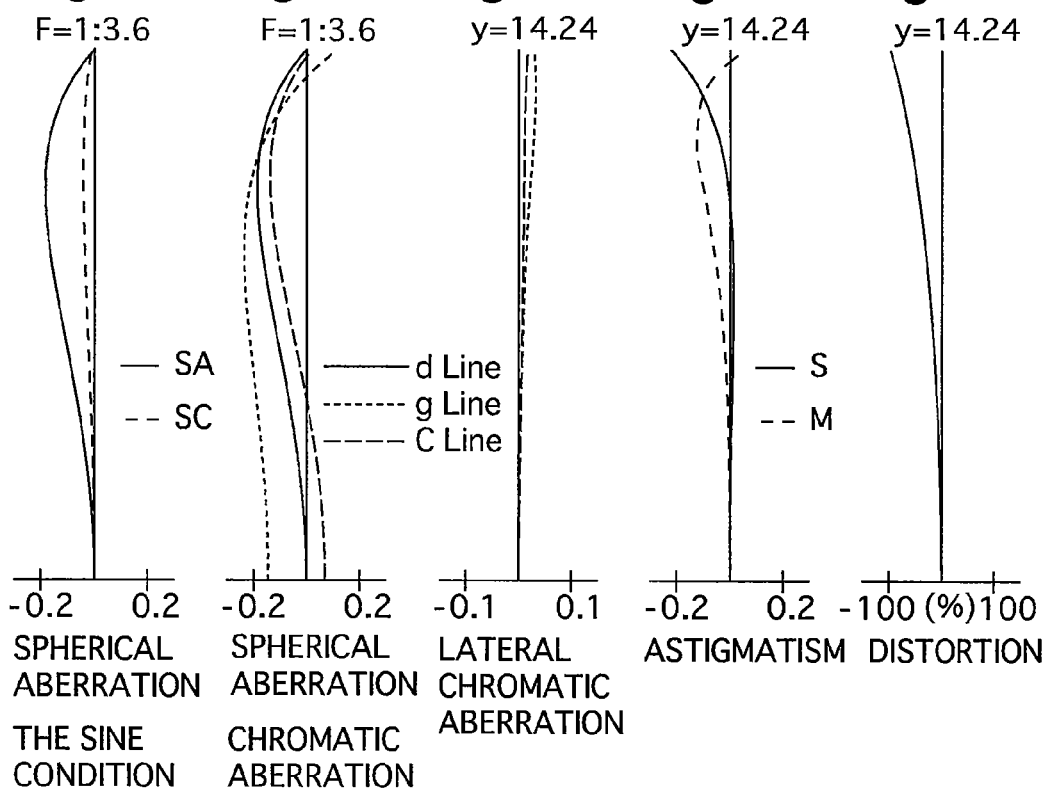

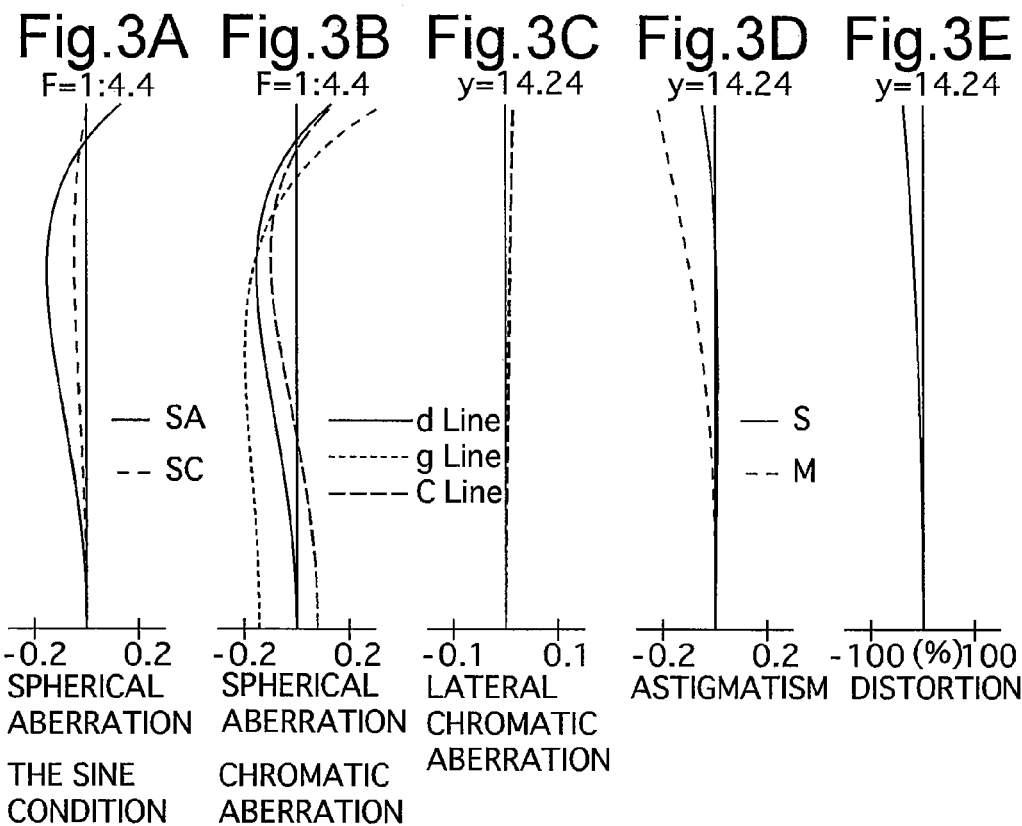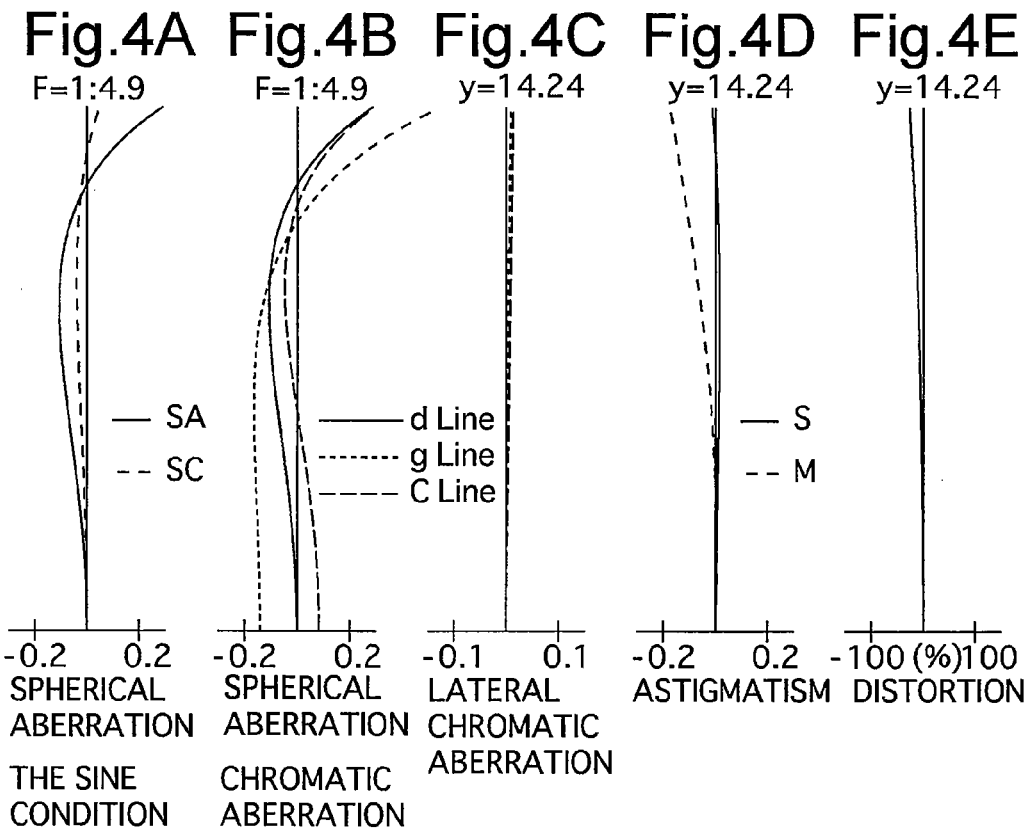

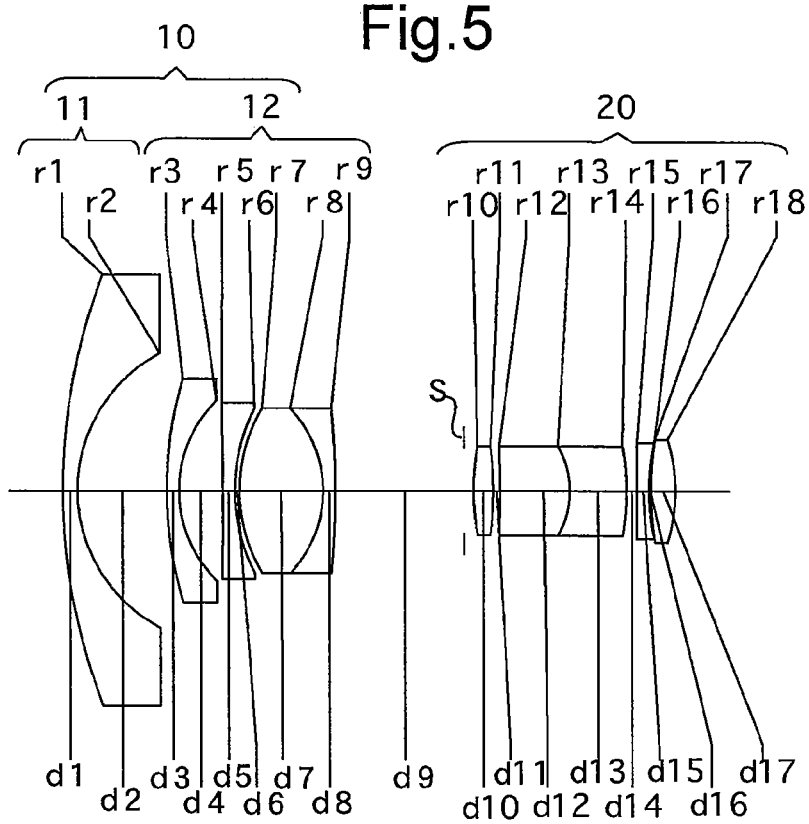
Fig.5
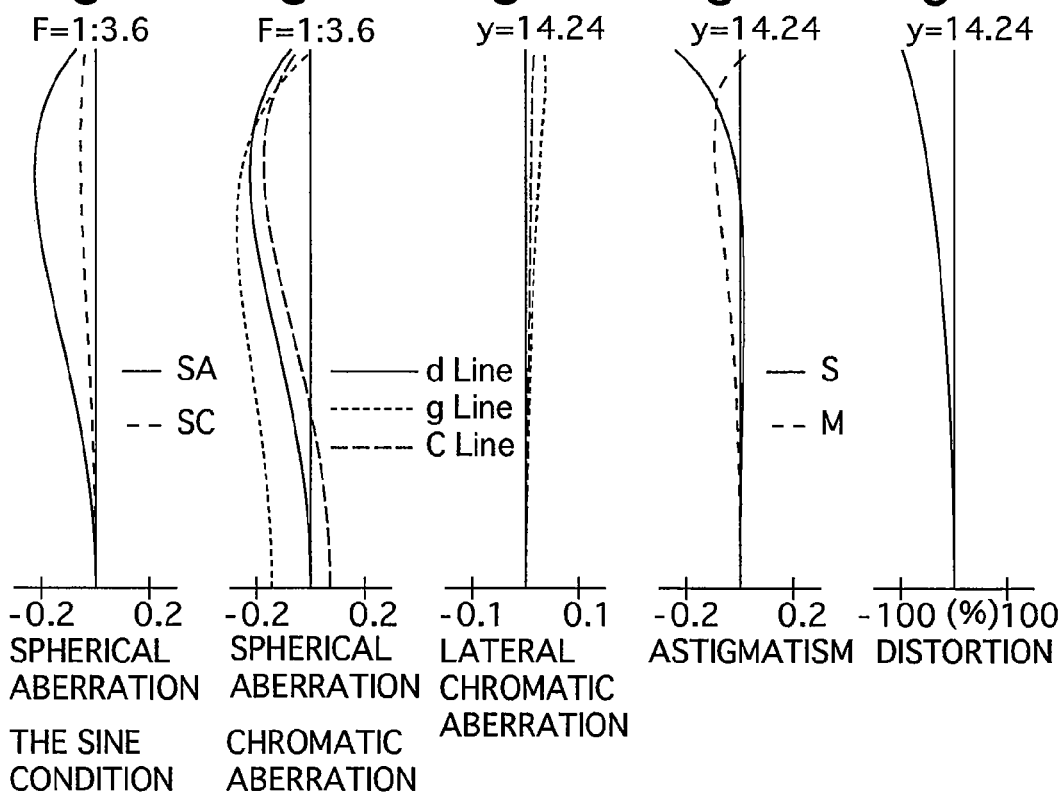

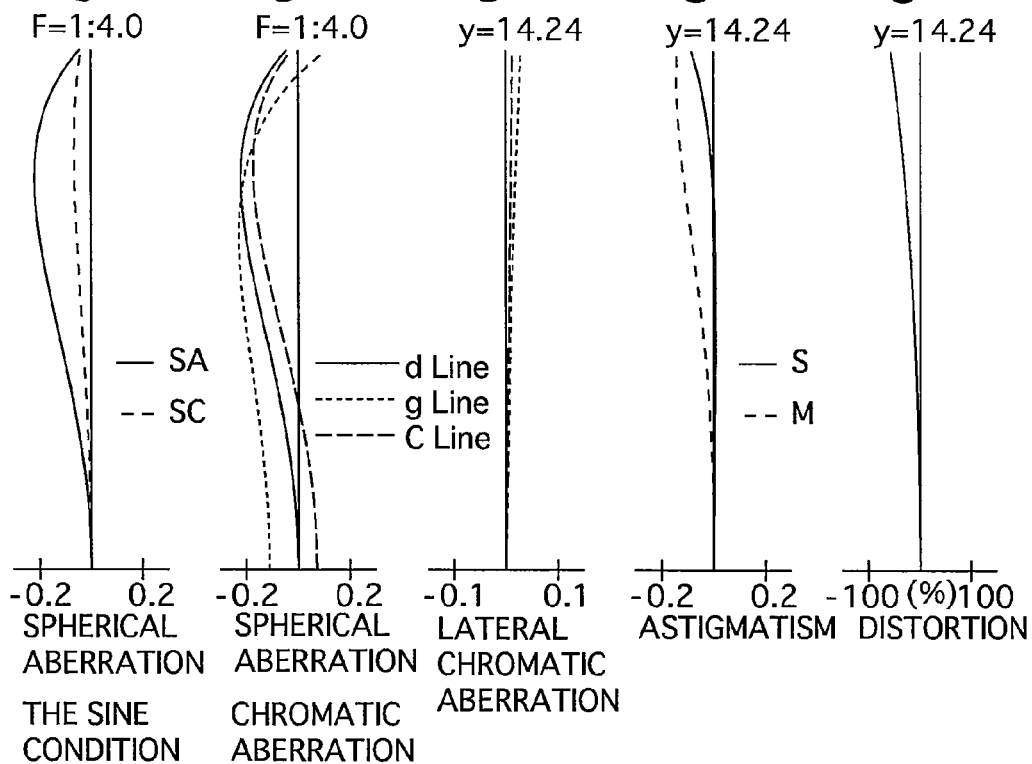
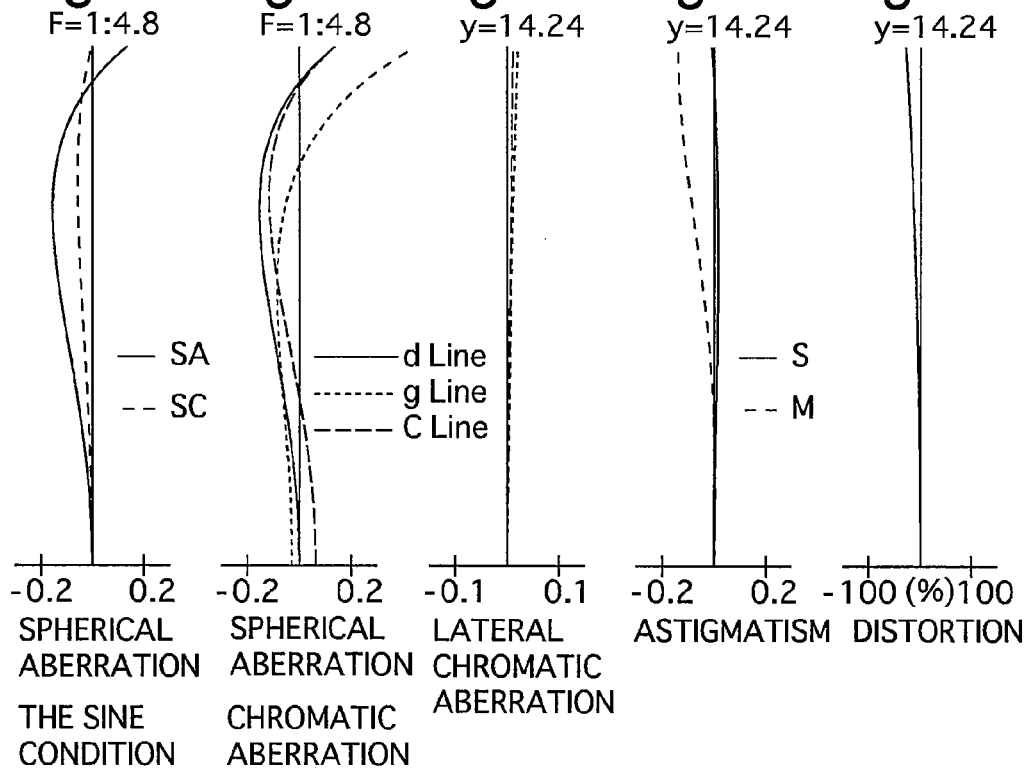

Fig.9
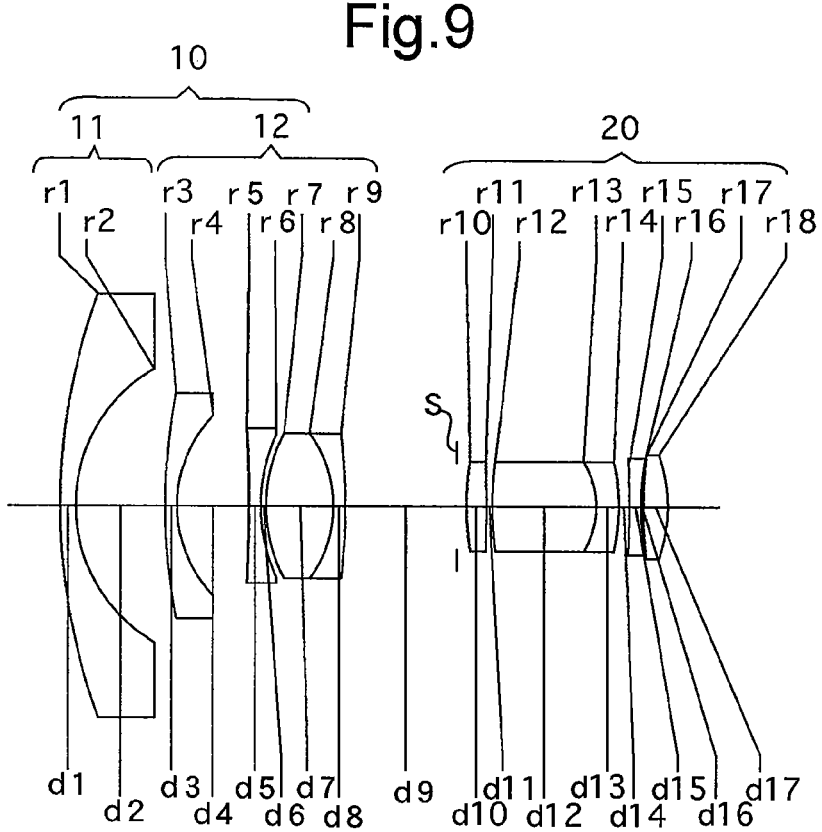
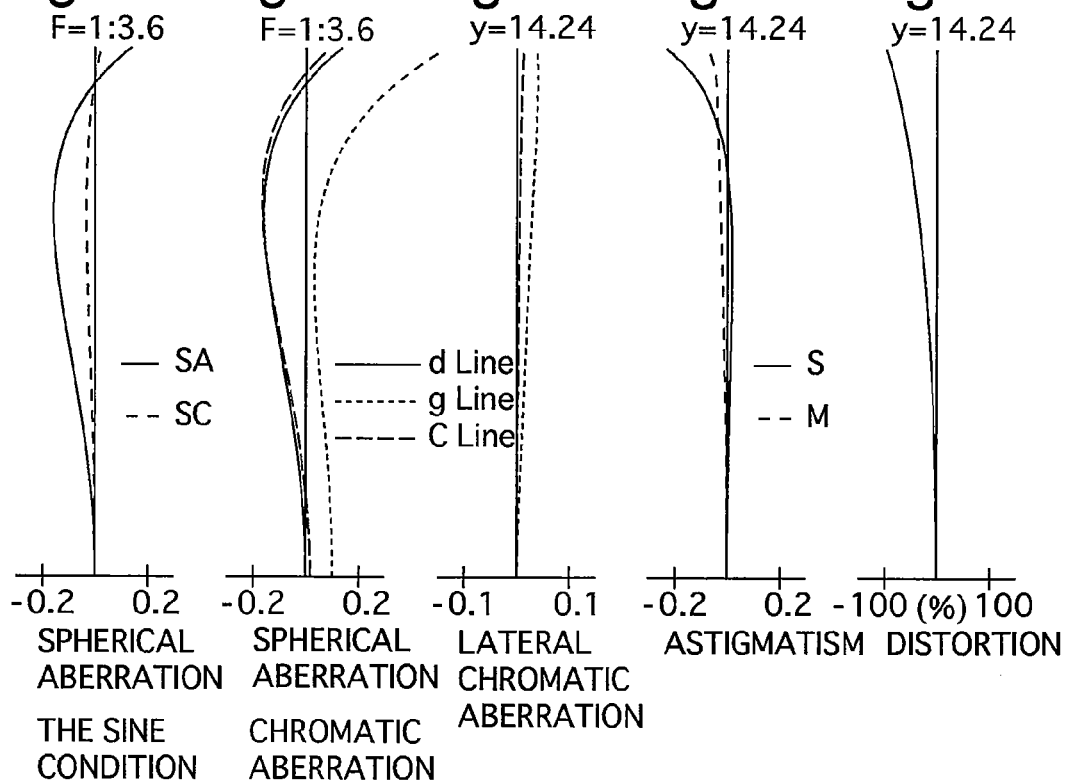

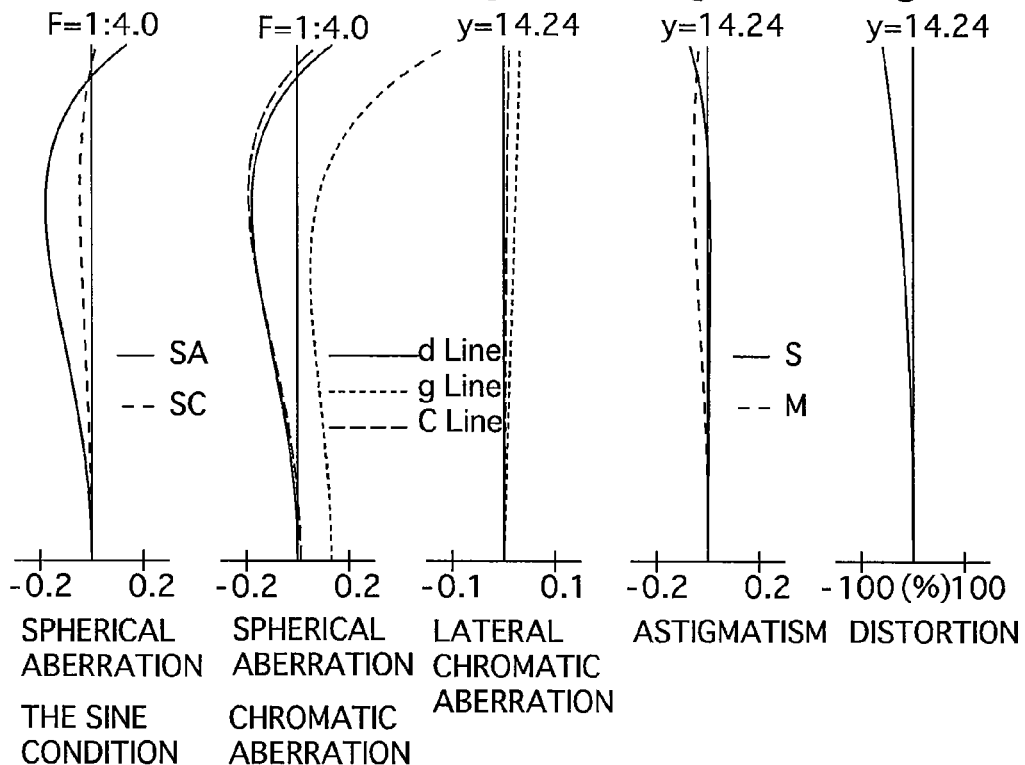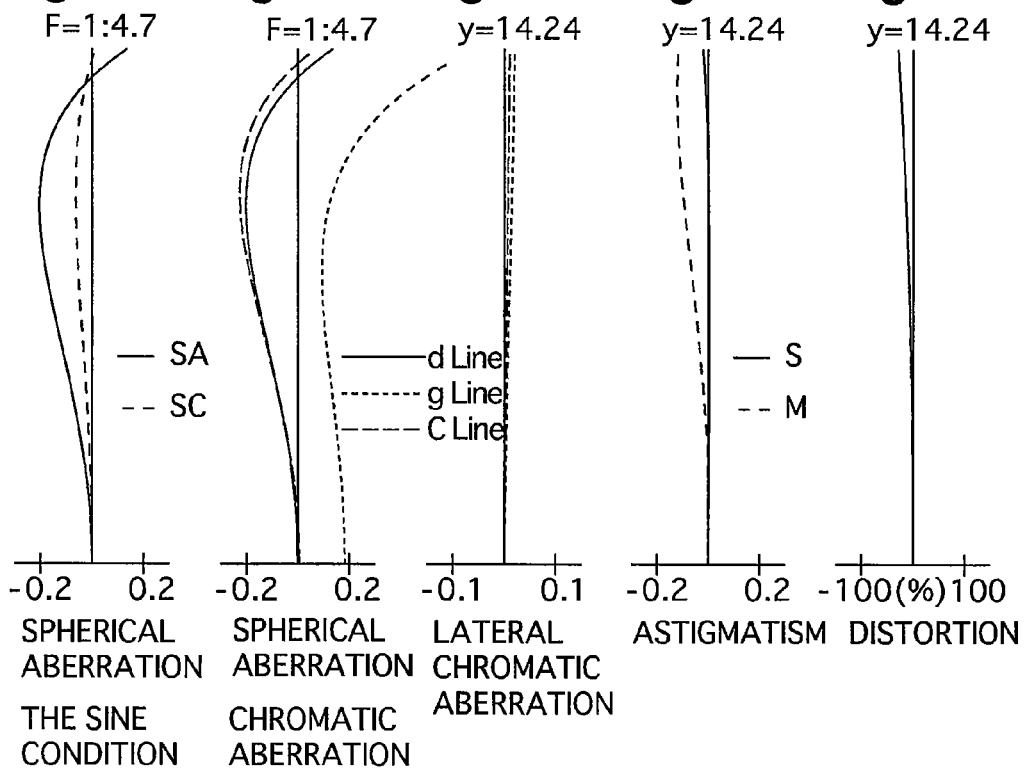

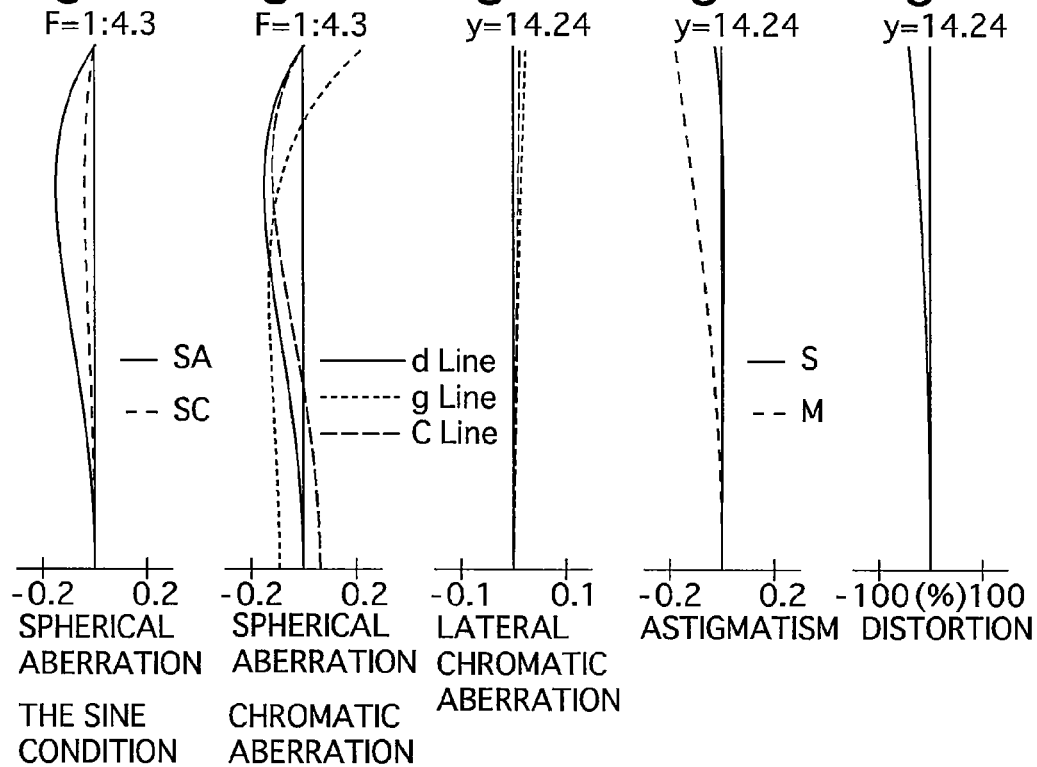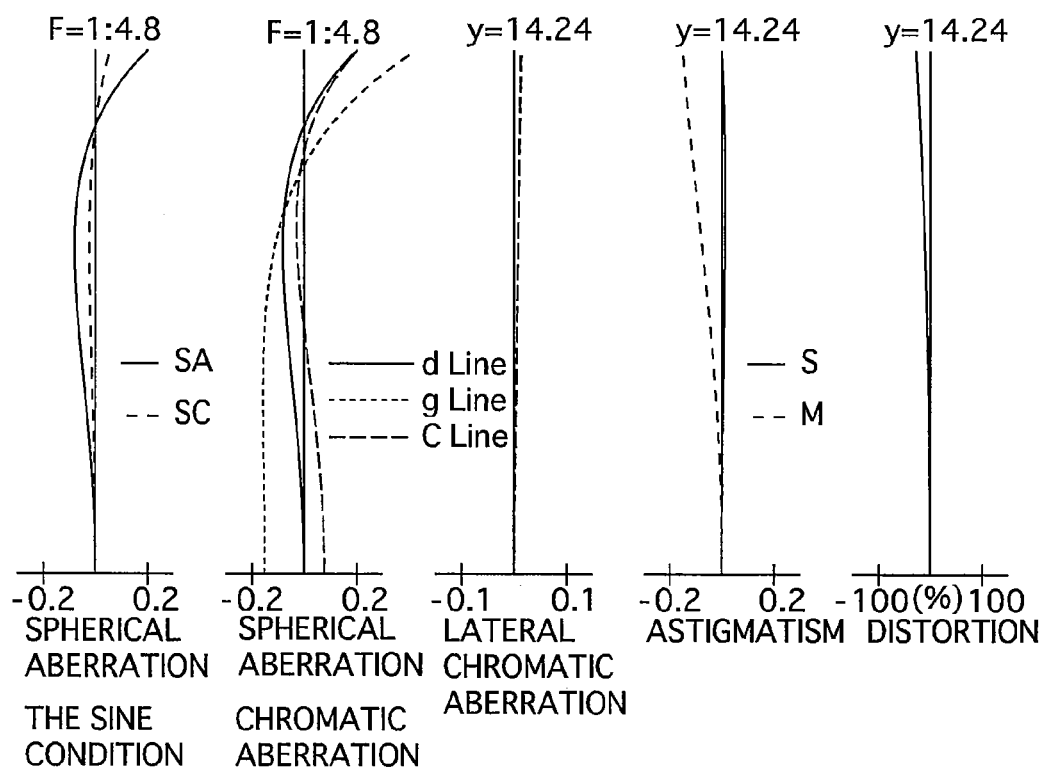

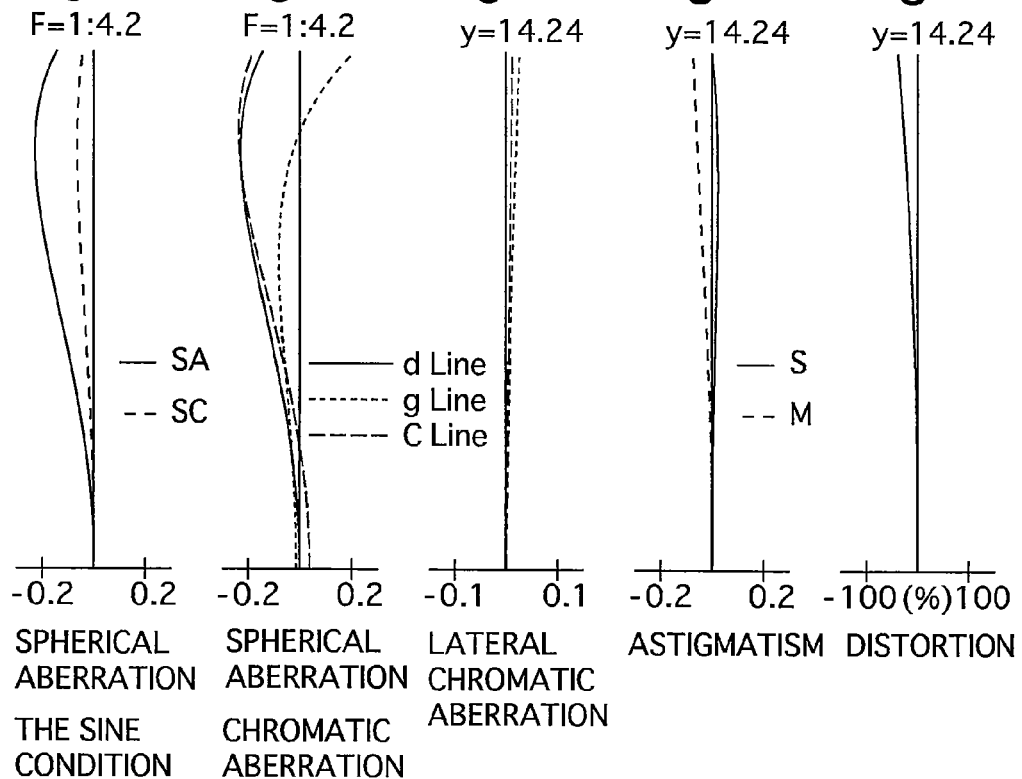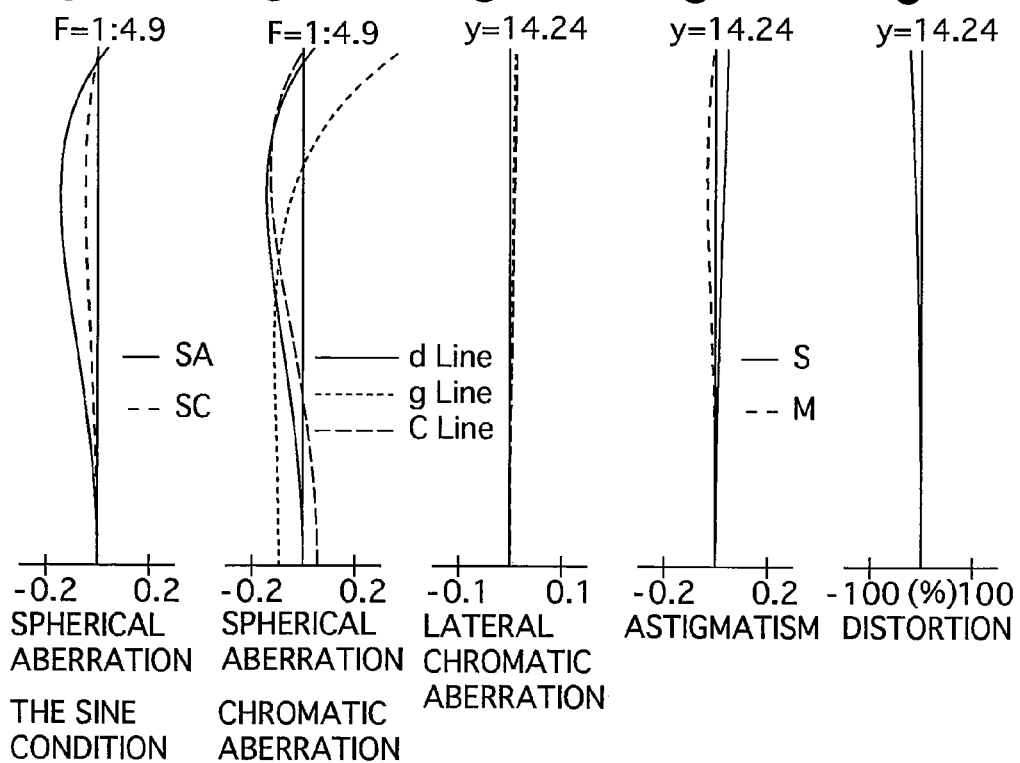

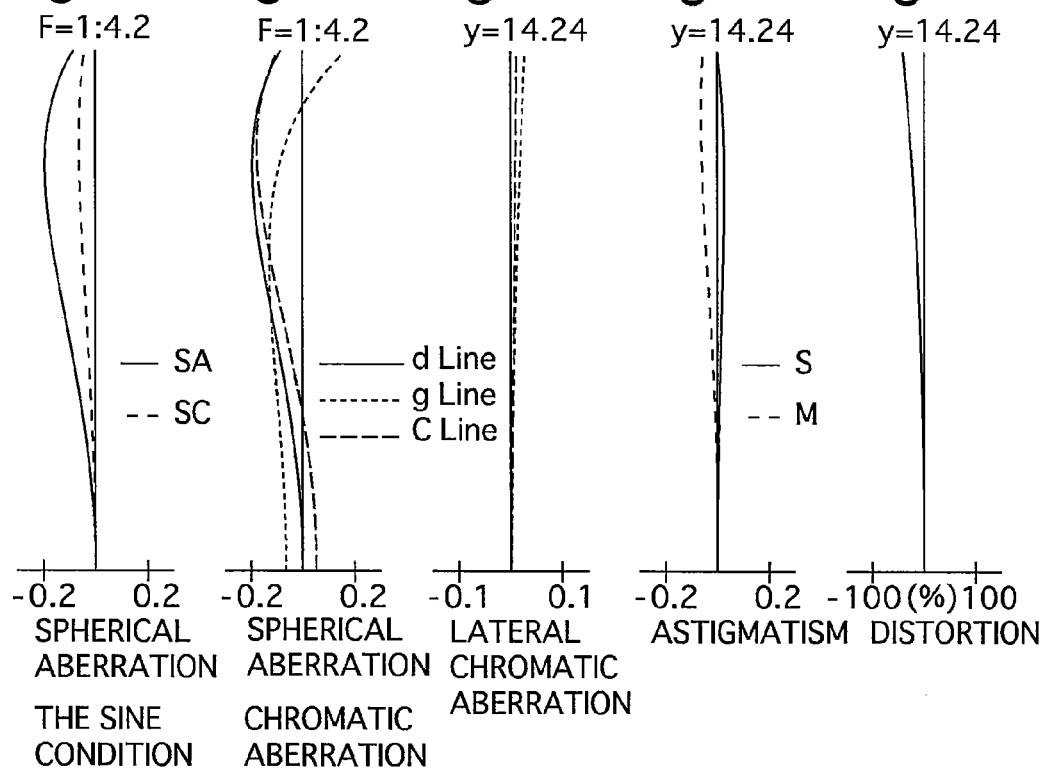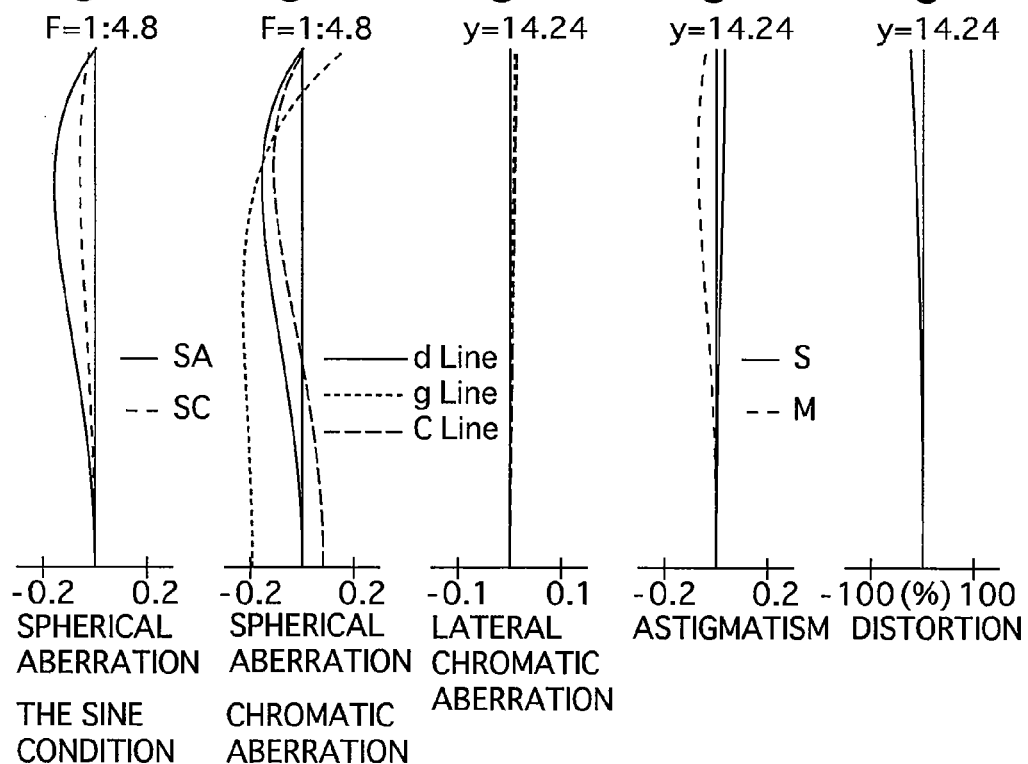

Fig.26A F=1:3.6 SPHERICAL ABERRATION THE SINE CONDITION
— SA
-- SC

Fig.26B F=1:3.6 SPHERICAL CHROMATIC ABERRATION
— d Line
---- g Line
----- C Line Fig.26C y=14.24 LATERAL CHROMATIC ABERRATION Fig.26D y=14.24 ASTIGMATISM
— S
-- M Fig.26E y=14.24 DISTORTION

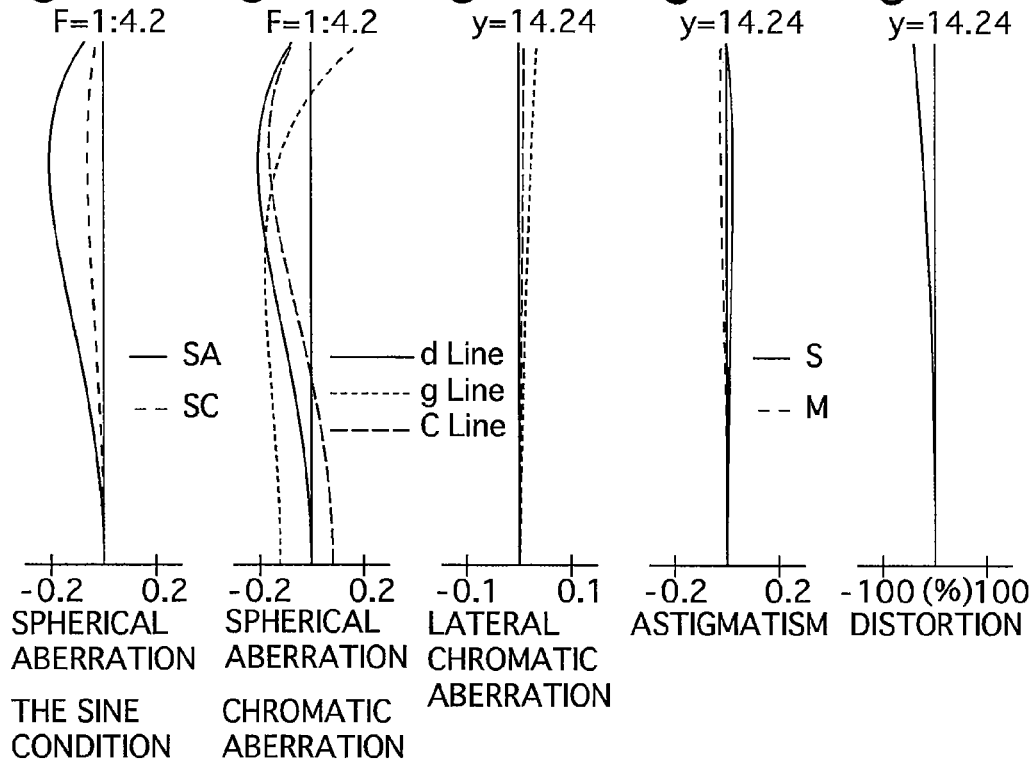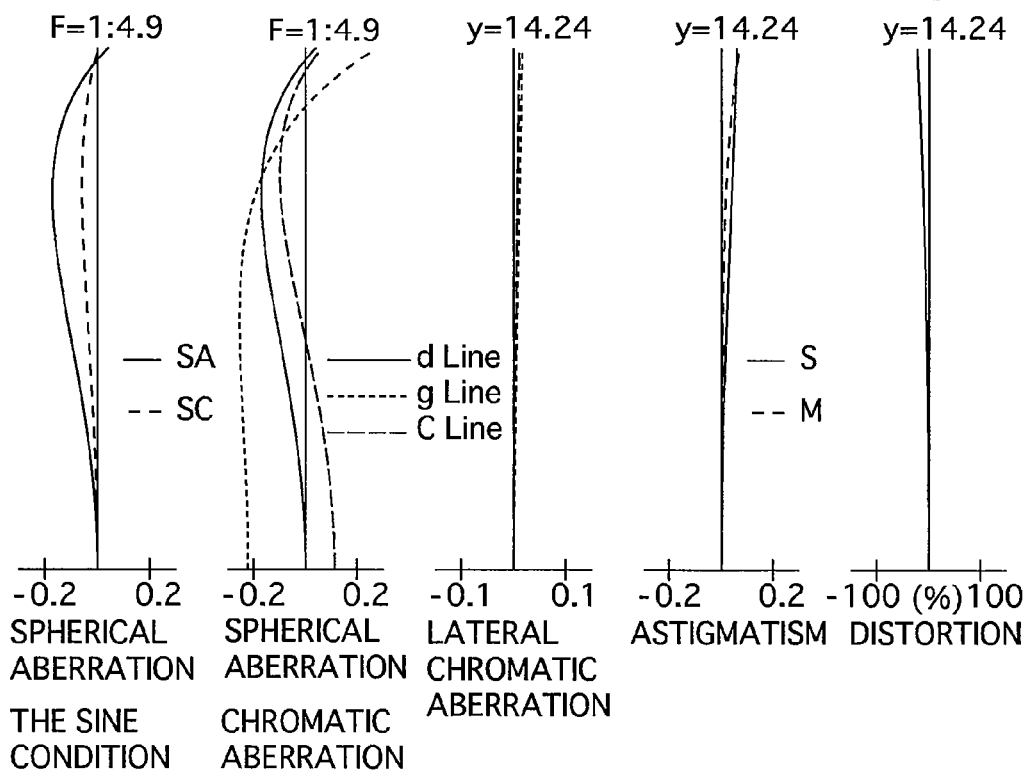

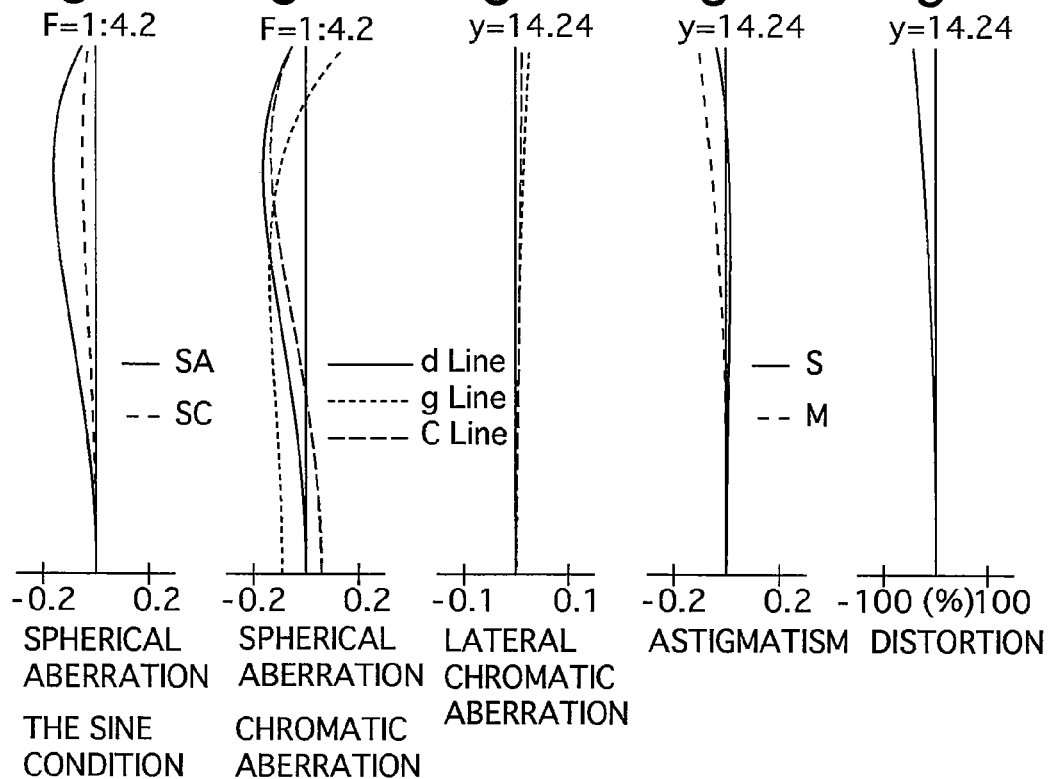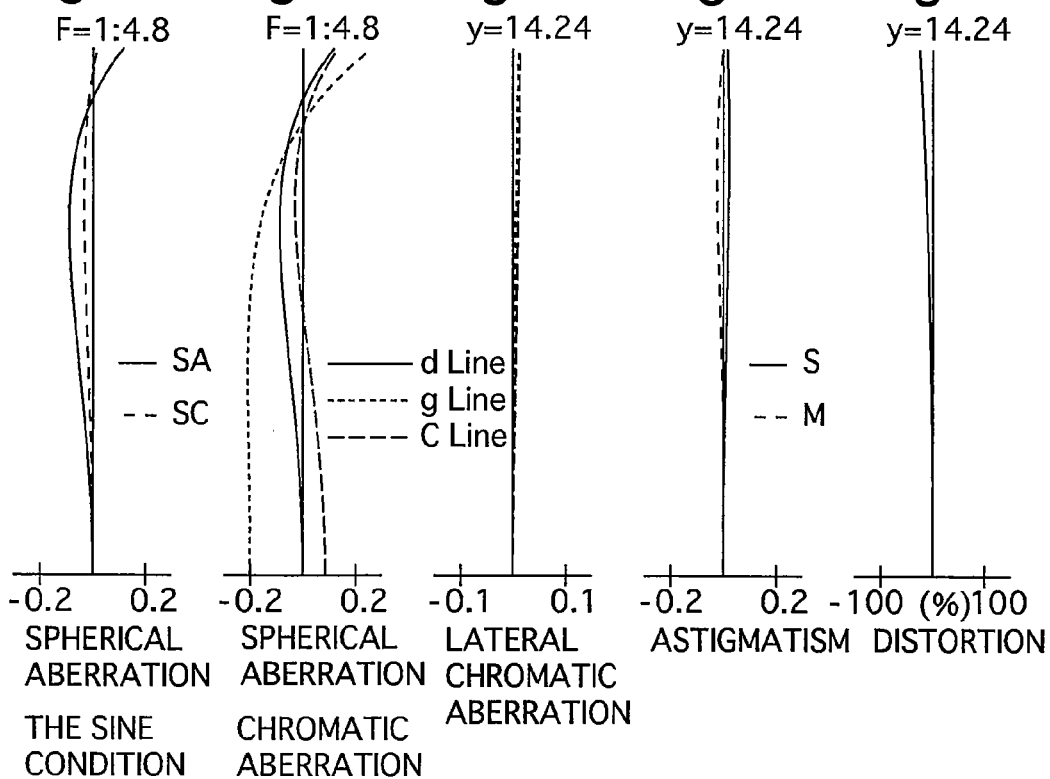

Fig. 33
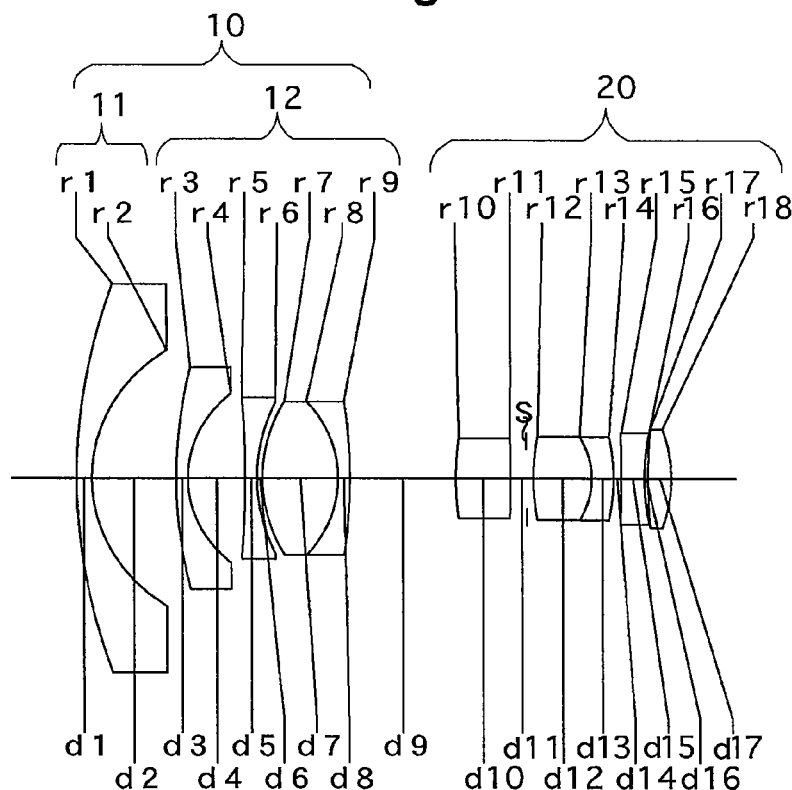
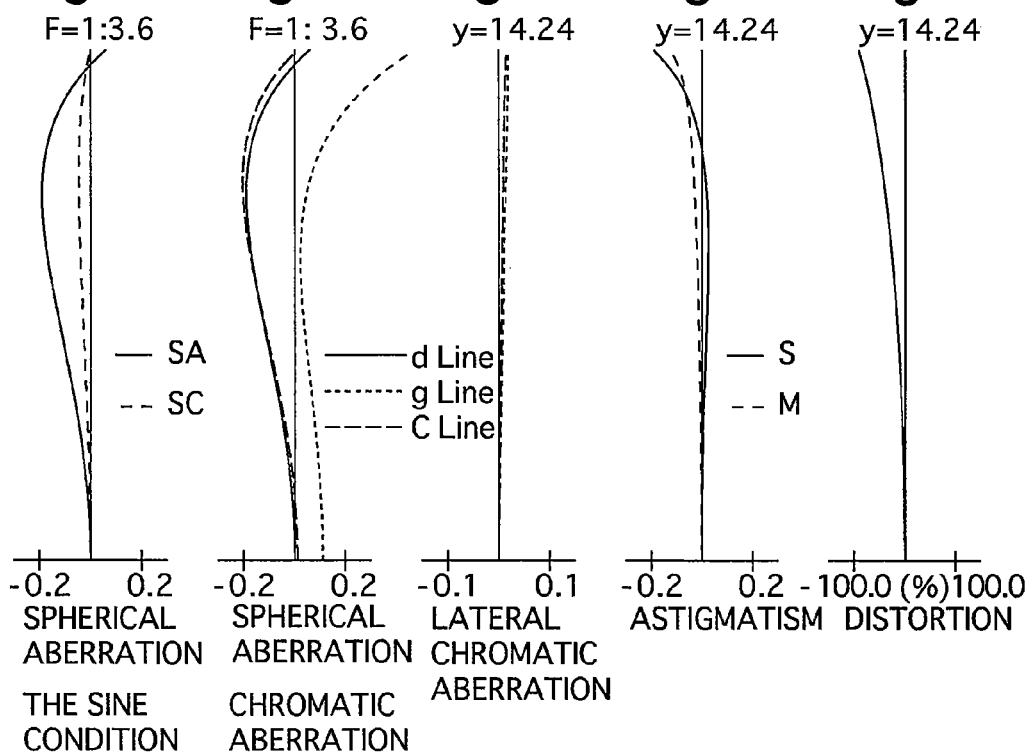
Fig. 34A   Fig. 34B   Fig. 34C   Fig. 34D   Fig. 34E
F=1:3.6   F=1:3.6   y=14.24   y=14.24   y=14.24
SA
SC
d Line
g Line
C Line
S
M
-0.2  0.2   -0.2  0.2   -0.1  0.1   -0.2  0.2   -100.0 (%) 100.0
SPHERICAL   SPHERICAL   LATERAL   ASTIGMATISM   DISTORTION
ABERRATION   ABERRATION   CHROMATIC
                          ABERRATION
THE SINE   CHROMATIC
CONDITION  ABERRATION

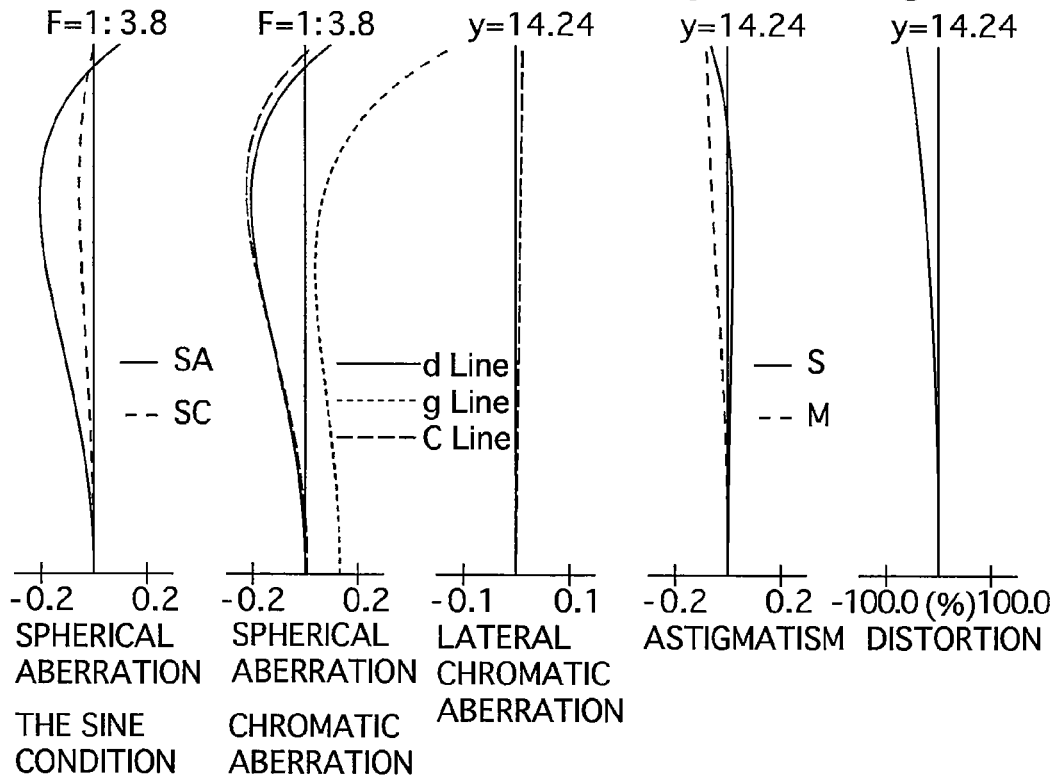
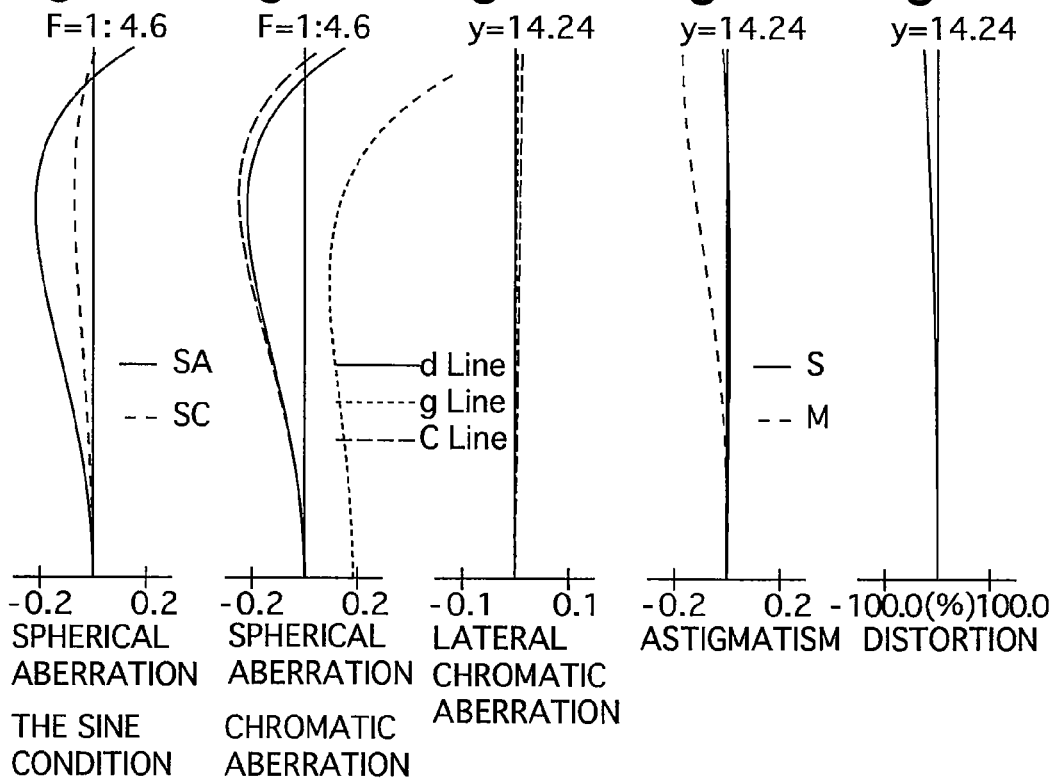

Fig.37
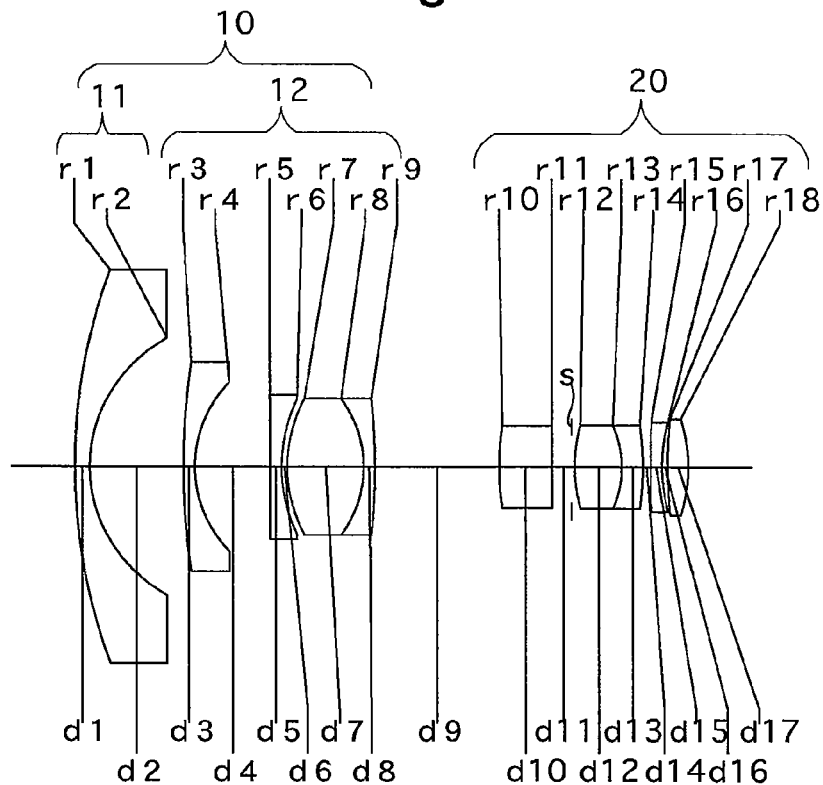
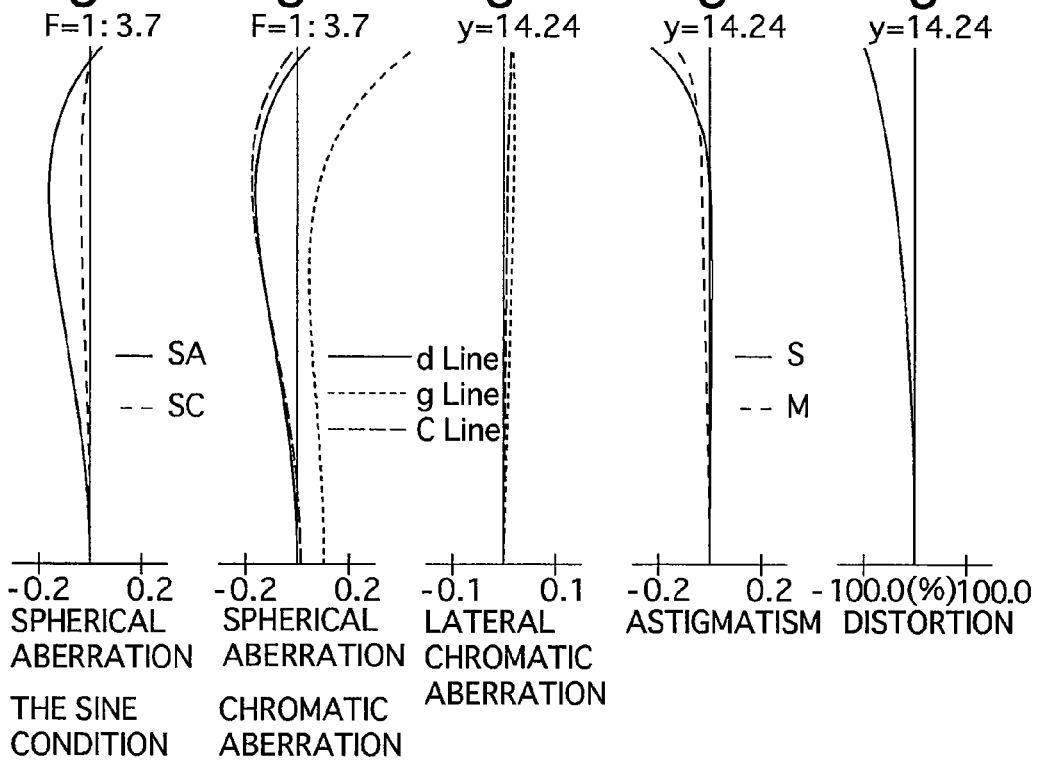
Fig.38A Fig.38B Fig.38C Fig.38D Fig.38E

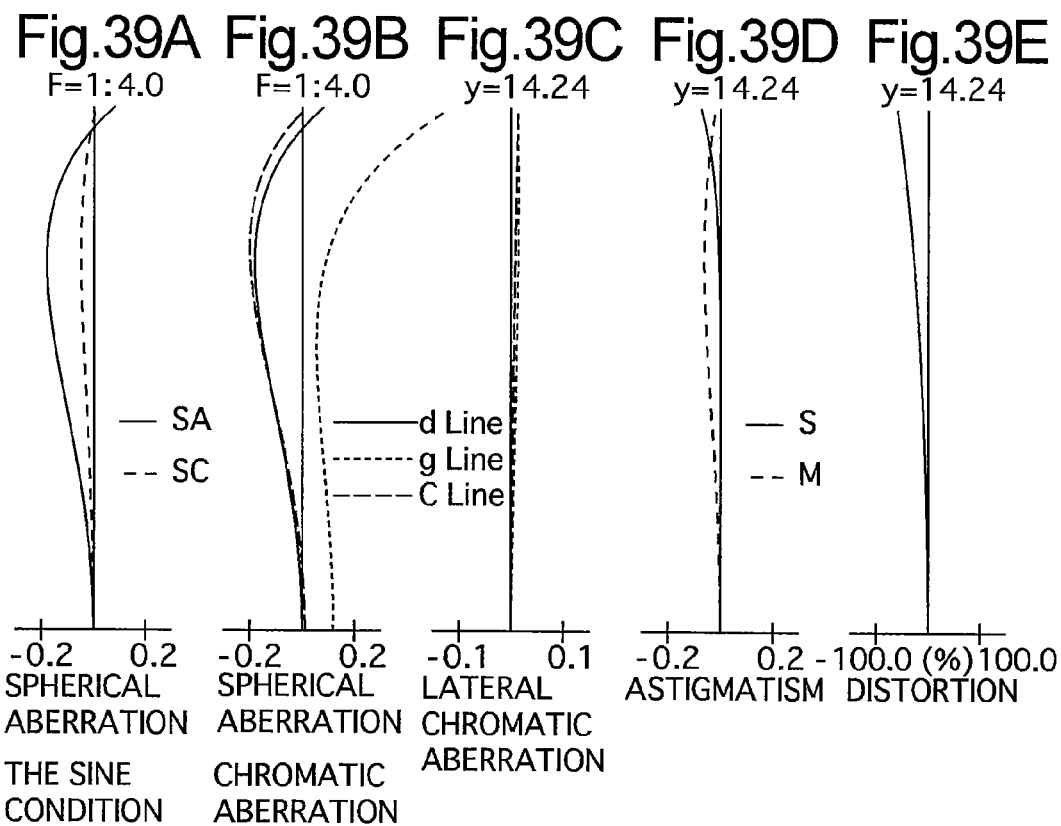
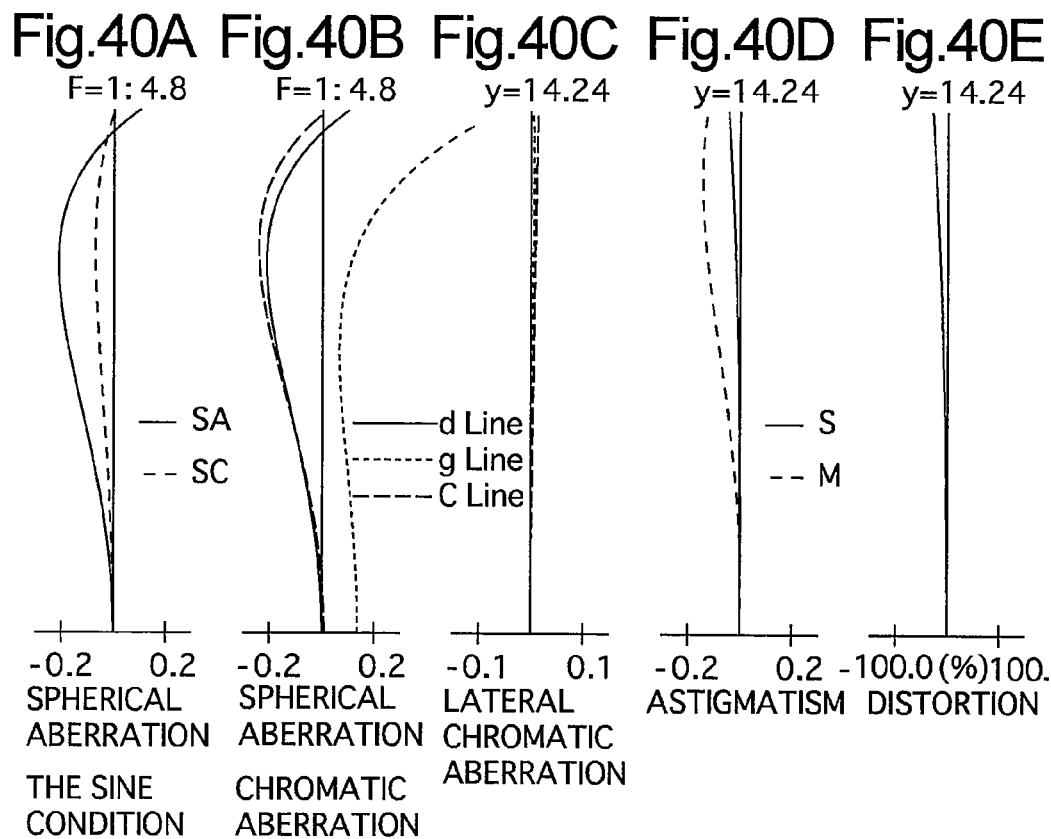

FISHEYE LENS SYSTEM AND A FISHEYE ZOOM LENS SYSTEM

BACKGROUND OF THE INVENTION

1. Field of the Invention

The present invention relates to a fisheye lens system, and to a fisheye zoom lens system suitable for a digital camera.

2. Description of the Prior Art

The applicant of the present invention has proposed a super wide-angle zoom lens system having a half angle-of-view exceeding 60° and up to 80° or more at the short focal length extremity in Japanese Unexamined Patent Publication No. H08-171053.

This super wide-angle zoom lens system was developed for the 135 (35 mm) film format, so that the overall length of a lens system is longer and the diameter thereof is larger with respect to the image-plane. Accordingly, such a super wide-angle zoom lens cannot be used for a digital camera having a smaller image-plane.

SUMMARY OF THE INVENTION

The present invention provides a fisheye lens system and a fisheye zoom lens system suitable for a digital camera having a smaller image-plane compared with the image-plane size for the 135 (35 mm) film format. The fisheye lens system and the fisheye zoom lens system can be miniaturized, while they have a back focal distance which is substantially the same as that of a camera of the 135 (35 mm) film format, and can suitably correct aberrations including lateral chromatic aberration.

According to an aspect of the present invention, there is provided a fisheye lens system including a first lens group having a negative refractive power (hereinafter, a negative first lens group) and a second lens group having a positive refractive power (hereinafter, a positive second lens group), in this order from the object. The negative first lens group and the positive second lens group are defined with respect to a maximum air-distance between lens elements constituting the fisheye lens system.

The negative first lens group includes a first negative meniscus lens element having the convex surface facing toward the object, a second negative meniscus lens element having the convex surface facing toward the object, and a negative third lens element, in this order from the object.

The fisheye lens system satisfies the following conditions:

$$0.25 < SF1 \leq 1.0 \quad (1)$$

$$0.1 < SF2 \leq 1.0 \quad (2)$$

$$0.9 < SF3 < 2.1 \quad (3)$$

wherein

SF1 designates the shaping factor of the first negative meniscus lens element ($SF1=(r1-r2)/(r1+r2)$);

r1 designates the radius of curvature of the object-side surface of the first negative meniscus lens element;

r2 designates the radius of curvature of the image-side surface of the first meniscus negative lens element.

SF2 designates the shaping factor of the second meniscus negative lens element ($SF2=(r3-r4)/(r3+r4)$);

r3 designates the radius of curvature of the object-side surface of the second negative meniscus lens element;

r4 designates the radius of curvature of the image-side surface of the second negative meniscus lens element;

SF3 designates the shaping factor of the negative third lens element ($SF3=(r5-r6)/(r5+r6)$);

r5 designates the radius of curvature of the object-side surface of the negative third lens element; and r6 designates the radius of curvature of the image-side surface of the negative third lens element.

In the negative first lens group, it is preferable that a biconvex positive lens element and a biconcave negative lens element which are cemented to have a positive refractive power be further provided on the image side of the negative third lens element.

In the positive second lens group, it is preferable that a positive lens element satisfying the following condition be provided:

$$70 < \nu 2p \quad (4)$$

wherein $\nu 2p$ designates the Abbe number of a positive lens element in the positive second lens group.

More preferably, a positive lens element of the positive second lens group satisfies the following condition:

$$80 < \nu 2p \quad (4')$$

Focusing is preferably carried out by the second negative meniscus lens element and lens elements provided therebehind in the negative first lens group, while the first negative meniscus lens element is made immovable.

In the case where focusing is carried out by the second negative meniscus lens element and lens elements provided therebehind in the negative first lens group, the fisheye lens system preferably satisfies the following condition:

$$0.5 < D_{(1a-1b)}/fw < 1.5 \quad (5)$$

wherein $D_{(1a-1b)}$ designates an air-distance between the first negative meniscus lens element and the second negative meniscus lens element; and fw designates the focal length of the entire the fisheye lens system at the short focal length extremity.

Furthermore, the fisheye lens system preferably satisfies the following conditions:

$$1.4 < |r2/f1| < 2.0 (f1<0) \quad (6)$$

$$0.2 < r2/r3 < 0.8 (r2, r3 > 0) \quad (7)$$

$$1.0 < f1a/f1b < 2.0 (f1a, f1b < 0) \quad (8)$$

wherein r2 designates the radius of curvature of the image-side surface of the (most object-side) first negative meniscus lens element in the negative first lens group;

r3 designates the radius of curvature of the object-side surface of the second negative meniscus lens element which is the second lens element from the object in the negative first lens group;

f1 designates the focal length of the negative first lens group;

f1a designates the focal length of the first negative meniscus lens element 11 in the negative first lens group 10; and f1b designates the combined focal length of the second negative meniscus lens element and lens elements therebehind in the negative first lens group 10 (hereinafter, the focusing lens elements 12).

It should be understood that the above-explained fisheye lens system can be developed into a fisheye zoom lens system.

More specifically, a position where the air-distance between the negative first lens group and the positive second lens group becomes maximum is set to be the short focal length extremity.

For example, lens-group moving paths for zooming from the short focal length extremity to the long focal length extremity can be determined as follows:

the negative first lens group is arranged to first move to the image, and then move to the object; and the positive second lens group is arranged to monotonically move toward the object.

The present disclosure relates to subject matters contained in Japanese Patent Application No. 2005-250023 (filed on Aug. 30, 2005) and Japanese Patent Application No. 2006-161774 (filed on Jun. 12, 2006) which are expressly incorporated herein in their entirety.

BRIEF DESCRIPTION OF THE DRAWINGS

The present invention will be discussed below in detail with reference to the accompanying drawings, in which:

FIG. 1 is a lens arrangement of the fisheye zoom lens system, at the short focal length extremity, according to a first embodiment of the present invention;

FIGS. 2A, 2B, 2C, 2D and 2E show aberrations occurred, at the short focal length extremity, in the lens arrangement shown in FIG. 1;

FIGS. 3A, 3B, 3C, 3D and 3E show aberrations occurred, at an intermediate focal length, in the lens arrangement shown in FIG. 1;

FIGS. 4A, 4B, 4C, 4D and 4E show aberrations occurred, at the long focal length extremity, in the lens arrangement shown in FIG. 1;

FIG. 5 is a lens arrangement of the fisheye zoom lens system, at the short focal length extremity, according to a second embodiment of the present invention;

FIGS. 6A, 6B, 6C, 6D and 6E show aberrations occurred, at the short focal length extremity, in the lens arrangement shown in FIG. 5;

FIGS. 7A, 7B, 7C, 7D and 7E show aberrations occurred, at an intermediate focal length, in the lens arrangement shown in FIG. 5;

FIGS. 8A, 8B, 8C, 8D and 8E show aberrations occurred, at the long focal length extremity, in the lens arrangement shown in FIG. 5;

FIG. 9 is a lens arrangement of the fisheye zoom lens system, at the short focal length extremity, according to a third embodiment of the present invention;

FIGS. 10A, 10B, 10C, 10D and 10E show aberrations occurred, at the short focal length extremity, in the lens arrangement shown in FIG. 9;

FIGS. 11A, 11B, 11C, 11D and 11E show aberrations occurred, at an intermediate focal length, in the lens arrangement shown in FIG. 9;

FIGS. 12A, 12B, 12C, 12D and 12E show aberrations occurred, at the long focal length extremity, in the lens arrangement shown in FIG. 9;

FIGS. 15A, 15B, 15C, 15D and 15E show aberrations occurred, at an intermediate focal length, in the lens arrangement shown in FIG. 13;

FIGS. 16A, 16B, 16C, 16D and 16E show aberrations occurred, at the long focal length extremity, in the lens arrangement shown in FIG. 13;

FIGS. 19A, 19B, 19C, 19D and 19E show aberrations occurred, at an intermediate focal length, in the lens arrangement shown in FIG. 17;

FIGS. 20A, 20B, 20C, 20D and 20E show aberrations occurred, at the long focal length extremity, in the lens arrangement shown in FIG. 17;

FIGS. 23A, 23B, 23C, 23D and 23E show aberrations occurred, at an intermediate focal length, in the lens arrangement shown in FIG. 21;

FIGS. 24A, 24B, 24C, 24D and 24E show aberrations occurred, at the long focal length extremity, in the lens arrangement shown in FIG. 21;

FIGS. 27A, 27B, 27C, 27D and 27E show aberrations occurred, at an intermediate focal length, in the lens arrangement shown in FIG. 25;

FIGS. 28A, 28B, 28C, 28D and 28E show aberrations occurred, at the long focal length extremity, in the lens arrangement shown in FIG. 25;

FIGS. 31A, 31B, 31C, 31D and 31E show aberrations occurred, at an intermediate focal length, in the lens arrangement shown in FIG. 29;

FIGS. 32A, 32B, 32C, 32D and 32E show aberrations occurred, at the long focal length extremity, in the lens arrangement shown in FIG. 29;

FIG. 33 is a lens arrangement of the fisheye zoom lens system, at the short focal length extremity, according to a ninth embodiment of the present invention;

FIGS. 34A, 34B, 34C, 34D and 34E show aberrations occurred, at the short focal length extremity, in the lens arrangement shown in FIG. 33;

FIGS. 35A, 35B, 35C, 35D and 35E show aberrations occurred, at an intermediate focal length, in the lens arrangement shown in FIG. 33;

FIGS. 36A, 36B, 36C, 36D and 36E show aberrations occurred, at the long focal length extremity, in the lens arrangement shown in FIG. 33;

FIG. 37 is a lens arrangement of the fisheye zoom lens system, at the short focal length extremity, according to a tenth embodiment of the present invention;

FIGS. 38A, 38B, 38C, 38D and 38E show aberrations occurred, at the short focal length extremity, in the lens arrangement shown in FIG. 37;

FIGS. 39A, 39B, 39C, 39D and 39E show aberrations occurred, at an intermediate focal length, in the lens arrangement shown in FIG. 37;

FIGS. 40A, 40B, 40C, 40D and 40E show aberrations occurred, at the long focal length extremity, in the lens arrangement shown in FIG. 37.

DESCRIPTION OF THE PREFERRED EMBODIMENTS

Figure 41:
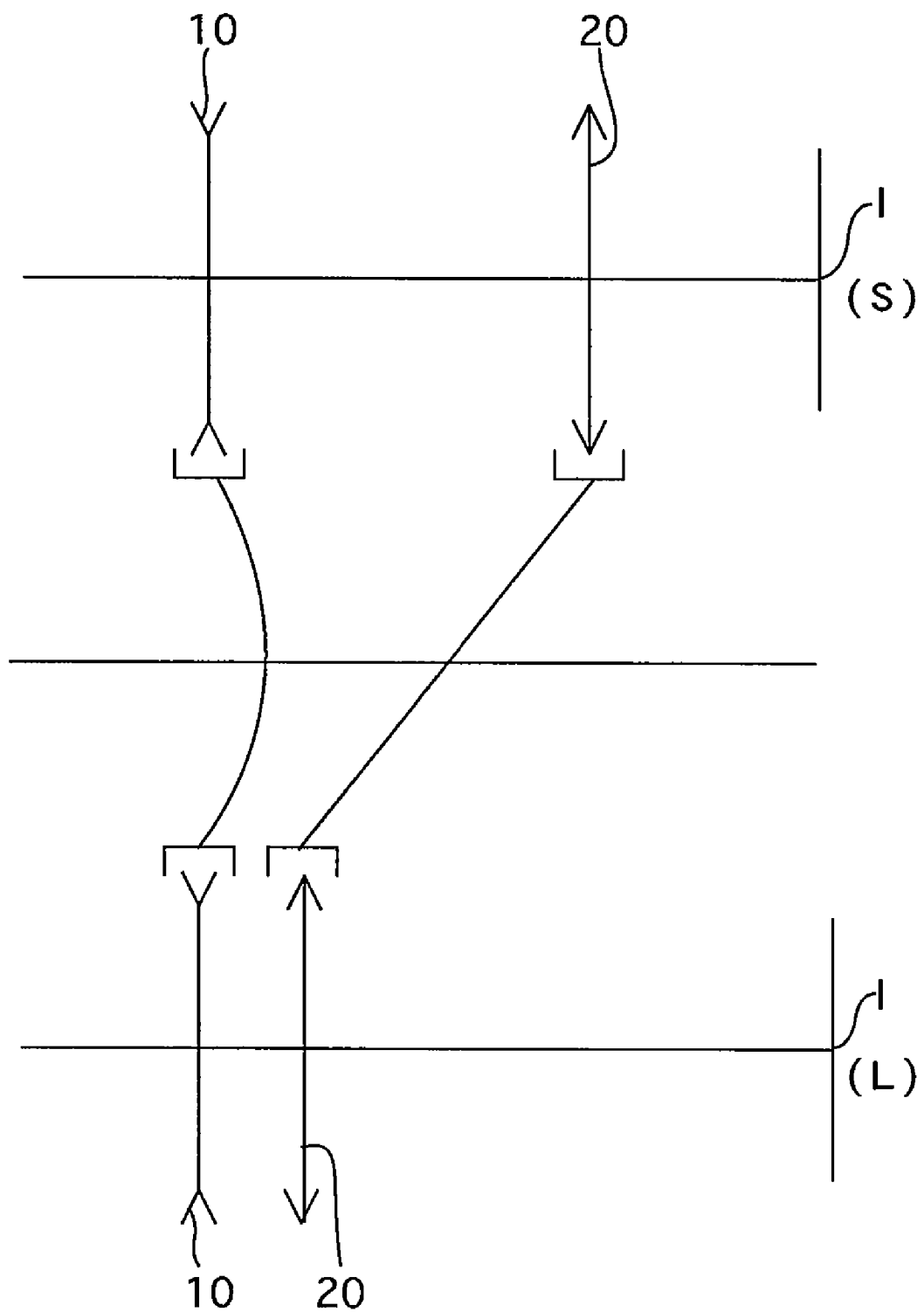
FIG. 41 is the schematic view of the lens-group moving paths for the fisheye zoom lens system according to the present invention.

FIG. 41 is the schematic view of the lens-group moving paths for the fisheye zoom lens system according to the present invention.

The fisheye zoom lens system includes a negative first lens group 10 and a positive second lens group 20, in this order from the object. The negative first lens group 10 and the positive second lens group 20 are defined with respect to a maximum air-distance, at the short focal length extremity, between lens elements constituting the fisheye zoom lens system.

Upon zooming from the short focal length extremity (S) to the long focal length extremity (L), the negative first lens group 10 is arranged to first move to the image, and then move to the object; and the positive second lens group 20 is arranged to monotonically move toward the object.

In addition, if the fisheye zoom lens system is made immovable at the short focal length extremity, the fisheye zoom lens system can be utilized as a fisheye lens system of a single focal length.

The first lens group 10 includes a first negative meniscus lens element 11 having the convex surface facing toward the object, a second negative meniscus lens element having the convex surface facing toward the object, and a negative third lens element, in this order from the object.

In the negative first lens group 10, a positive lens group is preferably provided on the image-side of the negative third lens element. All the first to tenth embodiments of the present invention to be explained hereinafter disclose the above positive lens group which is constituted by a biconvex positive lens element and a biconcave negative lens element which are cemented to each other.

Focusing is carried out either by moving the first lens group 10 as a whole, or by moving the focusing lens elements 12 (i.e., the second negative meniscus lens element and lens elements therebehind in the negative first lens group 10).

A diaphragm S can be provided between the first lens group 10 and the second lens group 20 (in front of the second lens group 20), as shown in the first through fourth embodiments, and the sixth through eighth embodiments.

The diaphragm S can also be provided in the positive second lens group 20 (in front of lens surface No. 12), as shown in the fifth, ninth and tenth embodiments.

The fisheye lens system and the fisheye zoom lens system of the present invention is characterized by the lens arrangement of the negative first lens group 10 and the configurations of the lens elements thereof; on the other hand, the positive second lens group 20 has degree of freedom in the lens arrangement thereof.

The above is because for a fisheye lens system and a fisheye zoom lens system, the first lens group positioned at the most object-side of the lens system, and the configurations of the lens elements thereof are very important factors to attain a smaller image-plane and a shorter back focal distance.

On the other hand, the positive second lens group 20 can have room for design under the condition that the second lens group 20 is arranged to have a positive refractive power.

Condition (1) specifies the shaping factor of the first negative meniscus lens element 11 of the negative first lens group 10.

If SF1 exceeds the upper limit of condition (1), the object-side surface of the first negative meniscus lens element 11 becomes the concave surface. Consequently, it is difficult to secure a half angle-of-view of 60° or more.

If SF1 exceeds the lower limit of condition (1), the negative refractive power becomes stronger, so that off-axis astigmatism largely occurs.

Condition (2) specifies the shaping factor of the second negative meniscus lens element of the negative first lens group 10.

If SF2 exceeds the upper limit of condition (2), the object-side surface of the second negative meniscus lens element becomes the concave surface. Consequently, it is difficult to secure a half angle-of-view of 60° or more.

If SF2 exceeds the lower limit of condition (2), the negative refractive power becomes stronger, so that off-axis astigmatism and coma largely occur.

Here, note that SF=0 means a plane (a flat surface). Therefore it is possible to respectively form the object-side surface of the first and second negative meniscus lens elements as a flat surface.

Condition (3) specifies the shaping factor of the negative third lens element of the negative first lens group 10.

If SF3 exceeds the upper limit of condition (3), the object-side surface of the negative third lens element becomes the concave surface. Consequently, it is difficult to secure a half angle-of-view of 60° or more.

If SF3 exceeds the lower limit of condition (3), the negative refractive power becomes stronger, so that off-axis astigmatism, coma and spherical aberration largely occur.

Condition (4) (condition (4')) concerns lateral chromatic aberration in the positive second lens group 20. By satisfying condition (4), the occurrence of lateral chromatic aberration can be reduced.

If ν2p exceeds the lower limit of condition (4), the degree of refraction of the positive second lens group 20 becomes smaller (i.e., the refractive index becomes smaller), so that the light rays disperse. Consequently, lateral chromatic aberration largely occurs.

Furthermore, satisfying condition (4) is also advantageous for correcting on-axis chromatic aberration.

Condition (5) concerns internal focusing carried out in the negative first lens group 10.

As described above, the fisheye lens system and the fisheye zoom lens system of the present invention can perform focusing by moving the first lens group 10 as a whole, or by moving the focusing lens elements 12 in the negative first lens group 10.

In the case where focusing is carried out by the focusing lens elements 12, the fisheye zoom lens system preferably satisfies condition (5).

If $D_{(1a-1b)}$/fw exceeds the upper limit of condition (5), the diameter of the first negative meniscus lens element 11 becomes larger, the overall length of the fisheye zoom lens system becomes longer, and astigmatism largely occurs.

If $D_{(1a-1b)}$/fw exceeds the lower limit of condition (5), it is advantageous for miniaturization of the fisheye zoom lens system; however, the refractive power of the first negative meniscus lens element has to be made stronger when the entire negative first lens group 10 (or the focusing lens elements 12) is (are) at the shortest photographing distance. Consequently, astigmatism, coma, and spherical aberration largely occur.

Condition (6) specifies the radius of curvature of the image-side surface of the first negative meniscus lens element 11 in order to attain a larger angle-of-view of the negative first lens group 10, and to reduce the occurrence of aberrations at the same time.

If the radius of curvature of the image-side surface of the first negative meniscus lens element 11 becomes smaller to the extent that |r2/f1| exceeds the lower limit of condition (6), manufacture of the first negative meniscus lens element 11 becomes difficult.

If the radius of curvature of the image-side surface of the first negative meniscus lens element 11 becomes larger to the extent that |r2/f1| exceeds the upper limit of condition (6), the light rays is not concentric with respect to the larger angle-of-view. Consequently, the correcting of coma becomes difficult.

Condition (7) specifies the radius of curvatures of the opposing surfaces of the first and second negative meniscus lens elements in order to reduce the change in aberrations at a closer photographing distance in the case where internal focusing is performed by the focusing lens elements 12.

As condition (7) specifies, the values of the curvatures of the above opposing surfaces are both positive, which means that the orientation of the above opposing surfaces are made in the same direction. In other words, the concave surface of the first negative meniscus lens element 11 is arranged to face toward the convex surface of the second negative meniscus lens element.

If r2/r3 exceeds either the upper or lower limits of condition (7), the change in distance between the above opposing surfaces upon internal focusing becomes larger in the peripheral area where off-axis light rays pass than in the area where on-axis light ray pass. Consequently, the change in aberrations caused by off-axis light rays upon internal focusing becomes undesirably larger.

Condition (8) is provided for effectively performing internal focusing by the focusing lens elements 12.

Namely, condition (8) specifies the ratio of the focal length (refractive power) of the (stationary) first negative meniscus lens element 11 to that of the focusing lens elements 12.

If the refractive power of the first negative meniscus lens element 11 becomes stronger, i.e., the refractive power of the focusing lens elements 12 becomes weaker, to the extent that f1a/f1b exceeds the lower limit of condition (8), the traveling distance of the focusing lens elements 12 upon focusing becomes longer. Consequently, it becomes difficult to perform internal focusing.

If the refractive power of the first negative meniscus lens element 11 becomes weaker, i.e., the refractive power of the focusing lens elements 12 becomes stronger, to the extent that f1a/f1b exceeds the upper limit of condition (8), the change in the amount of aberrations occurred in the first negative meniscus lens element 11 upon focusing becomes larger.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, y designates the image height, and the two types of dotted lines respectively indicate magnification with respect to the g and C lines; however, the d line as the base line coincides with the ordinate.

In the diagrams of astigmatism, y designates the image height, S designates the sagittal image, and M designates the meridional image.

In the diagrams of distortion, y designates the image height.

The tables, FNO. designates the f-number, f designates the focal length of the entire fisheye zoom lens system, W designates the half angle-of-view (°), fB designates the back focal distance, r designates the radius of curvature, d designates the lens-element thickness or a distance between lens elements (lens groups) which is variable upon zooming, $N_d$ designates the refractive index of the d-line, and v designates the Abbe number.

The values for the distance "d" are indicated in the order of the short focal length extremity, an intermediate focal length and the long focal length extremity.

Embodiment 1

FIG. 1 is the lens arrangement of the fisheye zoom lens system, at the short focal length extremity, according to the first embodiment of the present invention. FIGS. 2A through 2E show aberrations occurred, at the short focal length extremity, in the lens arrangement shown in FIG. 1. FIGS. 3A through 3E show aberrations occurred, at an intermediate focal length, in the lens arrangement shown in FIG. 1. FIGS. 4A through 4E show aberrations occurred, at the long focal length extremity, in the lens arrangement shown in FIG. 1.

Table 1 shows the numerical data of the first embodiment.

The fisheye zoom lens system of the present invention includes a negative first lens group 10, and a positive second lens group 20, in this order from the object.

The first lens group 10 includes a first negative meniscus lens element 11 having the convex surface facing toward the object, a second negative meniscus lens element having the convex surface facing toward the object, a negative third lens element, and positive cemented lens elements constituted by a biconvex positive lens element and a biconcave negative lens element, in this order from the object.

The positive second lens group 20 includes a biconvex positive lens element, cemented lens elements constituted by a positive lens element and a negative lens element, a negative lens element, and a positive lens element, in this order from the object.

A diaphragm S is provided 1.20 in front of the positive second lens group 20 (surface No. 10).

TABLE 1

F = 1:3.6-4.4-4.9
f = 9.70-14.00-16.55
W = 89.0-58.6-49.2
fB = 38.97-48.66-54.41

| Surf. No. | r | d | Nd | v |
|---|---|---|---|---|
| 1 | 70.966 | 1.80 | 1.72916 | 54.7 |
| 2 | 18.332 | 11.71 | — | — |
| 3 | 41.164 | 1.50 | 1.77250 | 49.6 |

TABLE 1-continued

F = 1:3.6-4.4-4.9
f = 9.70-14.00-16.55
W = 89.0-58.6-49.2
fB = 38.97-48.66-54.41

| Surf. No. | r | d | Nd | ν |
|---|---|---|---|---|
| 4 | 15.304 | 5.78 | — | — |
| 5 | −242.011 | 1.50 | 1.88300 | 40.8 |
| 6 | 23.518 | 0.47 | — | — |
| 7 | 20.288 | 9.91 | 1.71736 | 29.5 |
| 8 | −15.000 | 1.50 | 1.88300 | 40.8 |
| 9 | −118.474 | 18.79-9.37-6.10 | — | — |
| 10 | 33.223 | 2.50 | 1.66998 | 39.3 |
| 11 | −41.859 | 0.50 | — | — |
| 12 | 926.686 | 6.94 | 1.49700 | 81.6 |
| 13 | −11.723 | 6.98 | 1.88300 | 40.8 |
| 14 | −39.443 | 1.30 | — | — |
| 15 | −256.563 | 1.50 | 1.80518 | 25.4 |
| 16 | 31.450 | 0.30 | — | — |
| 17 | 6.457 | 3.05 | 1.69680 | 55.5 |
| 18 | −20.037 | — | — | — |

Embodiment 2

FIG. 5 is the lens arrangement of the fisheye zoom lens system, at the short focal length extremity, according to the second embodiment of the present invention. FIGS. 6A through 6E show aberrations occurred, at the short focal length extremity, in the lens arrangement shown in FIG. 5. FIGS. 7A through 7E show aberrations occurred, at an intermediate focal length, in the lens arrangement shown in FIG. 5. FIGS. 8A through 8E show aberrations occurred, at the long focal length extremity, in the lens arrangement shown in FIG. 5.

Table 2 shows the numerical data of the second embodiment.

The basic lens arrangement is the same as that of the first embodiment.

A diaphragm S is provided 1.20 in front of the positive second lens group 20 (surface No. 10).

TABLE 2

F = 1:3.6-4.0-4.8
f = 9.87-12.00-16.10
W = 89.0-70.0-50.9
fB = 38.97-43.85-53.26

| Surf. No. | r | d | Nd | ν |
|---|---|---|---|---|
| 1 | 74.311 | 1.80 | 1.72916 | 54.7 |
| 2 | 19.319 | 11.14 | — | — |
| 3 | 48.235 | 1.50 | 1.83481 | 42.7 |
| 4 | 15.786 | 5.39 | — | — |
| 5 | −499.130 | 1.50 | 1.88300 | 40.8 |
| 6 | 22.640 | 0.59 | — | — |
| 7 | 20.418 | 10.30 | 1.71736 | 29.5 |
| 8 | −15.000 | 1.50 | 1.88300 | 40.8 |
| 9 | −114.741 | 17.25-11.91-5.60 | — | — |
| 10 | 30.367 | 2.50 | 1.66998 | 39.3 |
| 11 | −42.308 | 0.80 | — | — |
| 12 | −120.855 | 8.71 | 1.49700 | 81.6 |
| 13 | −11.149 | 7.00 | 1.88300 | 40.8 |
| 14 | −33.149 | 1.30 | — | — |
| 15 | −262.661 | 1.50 | 1.80518 | 25.4 |
| 16 | 29.526 | 0.21 | — | — |
| 17 | 41.766 | 3.05 | 1.69680 | 55.5 |
| 18 | −21.200 | — | — | — |

Embodiment 3

FIG. 9 is the lens arrangement of the fisheye zoom lens system, at the short focal length extremity, according to the third embodiment of the present invention. FIGS. 10A through 10E show aberrations occurred, at the short focal length extremity, in the lens arrangement shown in FIG. 9. FIGS. 11A through 11E show aberrations occurred, at an intermediate focal length, in the lens arrangement shown in FIG. 9. FIGS. 12A through 12E show aberrations occurred, at the long focal length extremity, in the lens arrangement shown in FIG. 9.

Table 3 shows the numerical data of the third embodiment.

The basic lens arrangement is the same as that of the first embodiment.

A diaphragm S is provided 1.20 in front of the positive second lens group 20 (surface No. 10).

TABLE 3

F = 1:3.6-4.0-4.7
f = 9.99-12.00-16.10
W = 89.0-70.9-51.2
fB = 38.97-43.58-53.01

| Surf. No. | r | d | Nd | ν |
|---|---|---|---|---|
| 1 | 78.490 | 1.90 | 1.72916 | 54.7 |
| 2 | 20.131 | 11.31 | — | — |
| 3 | 75.438 | 1.50 | 1.77250 | 49.6 |
| 4 | 16.614 | 9.11 | — | — |
| 5 | −221.111 | 1.50 | 1.88300 | 40.8 |
| 6 | 21.730 | 0.70 | — | — |
| 7 | 20.049 | 8.50 | 1.71736 | 29.5 |
| 8 | −15.350 | 1.50 | 1.88300 | 40.8 |
| 9 | −80.922 | 15.36-10.18-3.62 | — | — |
| 10 | 38.560 | 2.50 | 1.66998 | 39.3 |
| 11 | −408.760 | 0.80 | — | — |
| 12 | 44.700 | 13.03 | 1.49700 | 81.6 |
| 13 | −11.306 | 2.87 | 1.88300 | 40.8 |
| 14 | −26.608 | 1.30 | — | — |
| 15 | −134.343 | 1.50 | 1.80518 | 25.4 |
| 16 | 33.503 | 0.31 | — | — |
| 17 | 57.904 | 3.05 | 1.69680 | 55.5 |
| 18 | −20.500 | — | — | — |

Embodiment 4

Figure 13:
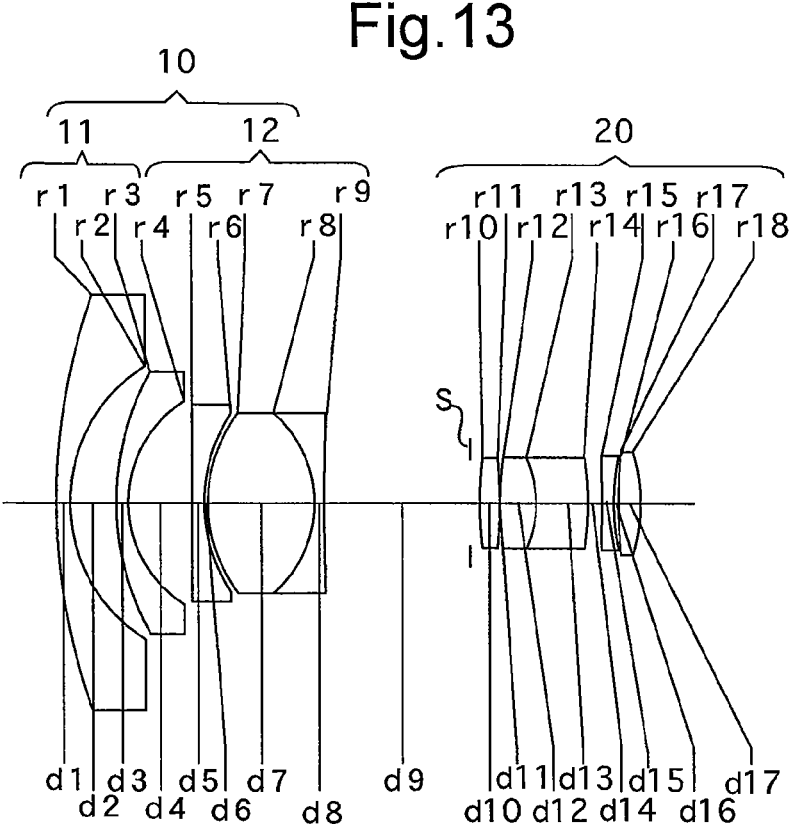
FIG. 13 is a lens arrangement of the fisheye zoom lens system, at the short focal length extremity, according to a fourth embodiment of the present invention.
Figures 14A, 14B, 14C, 14D, 14E:
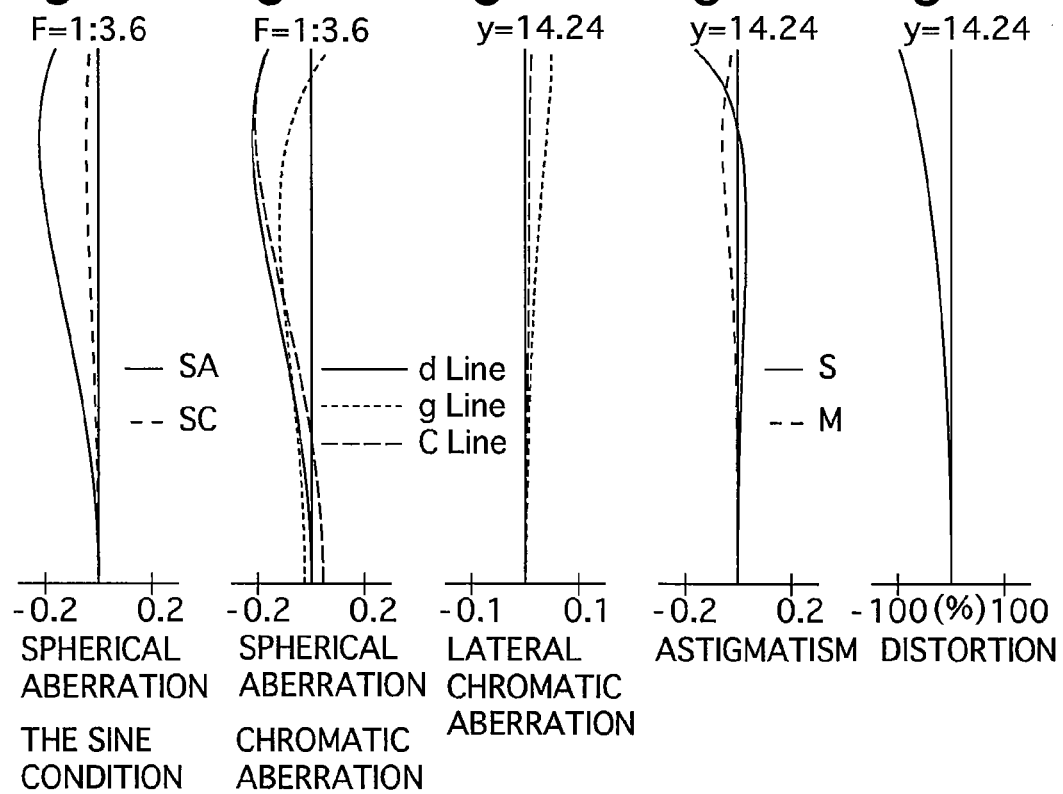
FIGS. 14A, 14B, 14C, 14D and 14E show aberrations occurred, at the short focal length extremity, in the lens arrangement shown in FIG. 13.

FIG. 13 is the lens arrangement of the fisheye zoom lens system, at the short focal length extremity, according to a fourth embodiment of the present invention. FIGS. 14A through 14E show aberrations occurred, at the short focal length extremity, in the lens arrangement shown in FIG. 13. FIGS. 15A through 15E show aberrations occurred, at an intermediate focal length, in the lens arrangement shown in FIG. 13. FIGS. 16A through 16E show aberrations occurred, at the long focal length extremity, in the lens arrangement shown in FIG. 13.

Table 4 shows the numerical data of the fourth embodiment.

The basic lens arrangement of the fourth embodiment is the same as that of the first embodiment.

A diaphragm S is provided 1.20 in front of the positive second lens group 20 (surface No. 10).

TABLE 4

F = 1:3.6-4.3-4.8
f = 10.04-14.00-16.55
W = 89.0-59.5-49.7
fB = 38.93-47.28-52.66

| Surf. No. | r | d | Nd | ν |
|---|---|---|---|---|
| 1 | 76.610 | 1.70 | 1.72916 | 54.7 |
| 2 | 20.208 | 5.85 | — | — |
| 3 | 33.584 | 1.50 | 1.83481 | 42.7 |
| 4 | 15.131 | 8.01 | — | — |
| 5 | −2342.039 | 1.50 | 1.80400 | 46.6 |
| 6 | 20.269 | 0.46 | — | — |
| 7 | 18.599 | 13.34 | 1.69895 | 30.1 |
| 8 | −15.000 | 1.22 | 1.80400 | 46.6 |
| 9 | 299.613 | 19.33-10.99-7.73 | — | — |
| 10 | 47.277 | 2.45 | 1.66998 | 39.3 |
| 11 | −67.303 | 0.10 | — | — |
| 12 | 39.712 | 4.48 | 1.49700 | 81.6 |
| 13 | −14.120 | 6.54 | 1.88300 | 40.8 |
| 14 | −37.050 | 1.72 | — | — |
| 15 | −513.777 | 1.50 | 1.80518 | 25.4 |
| 16 | 29.601 | 0.60 | — | — |
| 17 | 72.884 | 2.77 | 1.69680 | 55.5 |
| 18 | −22.139 | — | — | — |

Embodiment 5

Figure 17:
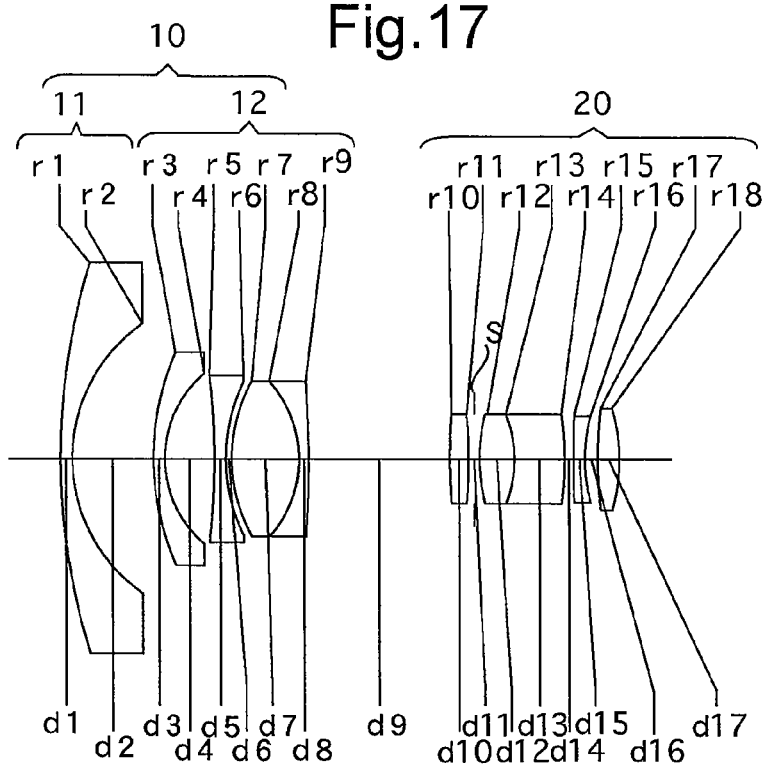
FIG. 17 is a lens arrangement of the fisheye zoom lens system, at the short focal length extremity, according to a fifth embodiment of the present invention.
Figures 18A, 18B, 18C, 18D, 18E:
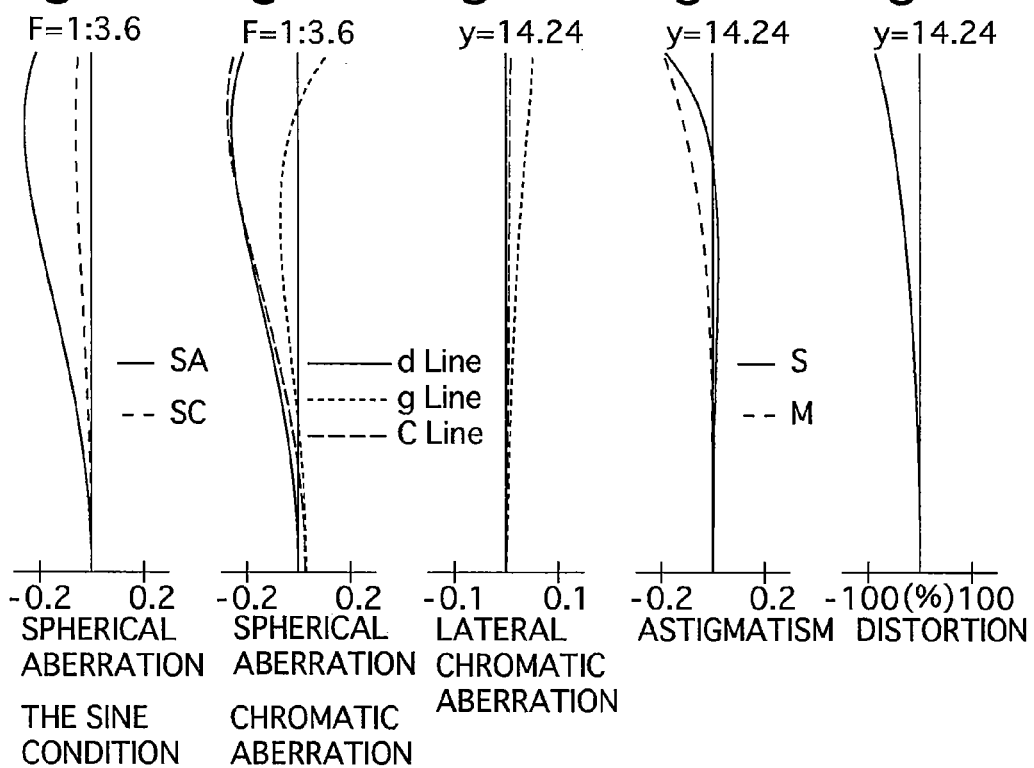
FIGS. 18A, 18B, 18C, 18D and 18E show aberrations occurred, at the short focal length extremity, in the lens arrangement shown in FIG. 17.

FIG. 17 is the lens arrangement of the fisheye zoom lens system, at the short focal length extremity, according to a fifth embodiment of the present invention. FIGS. 18A through 18E show aberrations occurred, at the short focal length extremity, in the lens arrangement shown in FIG. 17. FIGS. 19A through 19E show aberrations occurred, at an intermediate focal length, in the lens arrangement shown in FIG. 17. FIGS. 20A through 20E show aberrations occurred, at the long focal length extremity, in the lens arrangement shown in FIG. 17.

Table 5 shows the numerical data of the fifth embodiment.

The basic lens arrangement of the fifth embodiment is the same as that of the first embodiment.

A diaphragm S is provided 0.70 in front of surface No. 12 in the positive second lens group 20.

TABLE 5

F = 1:3.6-4.2-4.9
f = 10.54-14.00-18.00
W = 84.2-59.4-45.5
fB = 37.00-44.18-52.50

| Surf. No. | r | d | Nd | ν |
|---|---|---|---|---|
| 1 | 84.146 | 1.50 | 1.77250 | 49.6 |
| 2 | 21.107 | 10.53 | — | — |
| 3 | 33.450 | 1.50 | 1.77250 | 49.6 |
| 4 | 14.368 | 6.39 | — | — |
| 5 | −99.851 | 1.50 | 1.80400 | 46.6 |
| 6 | 22.858 | 0.74 | — | — |
| 7 | 20.744 | 8.67 | 1.69895 | 30.1 |
| 8 | −15.000 | 1.20 | 1.80400 | 46.6 |
| 9 | −149.965 | 18.03-10.86-5.99 | — | — |
| 10 | 62.461 | 2.45 | 1.64769 | 33.8 |
| 11 | −62.461 | 1.40 | — | — |
| 12 | 22.449 | 4.48 | 1.49700 | 81.6 |
| 13 | −16.162 | 6.54 | 1.83400 | 37.2 |
| 14 | −42.045 | 1.17 | — | — |
| 15 | 284.711 | 1.45 | 1.80518 | 25.4 |
| 16 | 21.819 | 1.68 | — | — |
| 17 | 60.349 | 2.77 | 1.65160 | 58.5 |
| 18 | −24.133 | — | — | — |

Embodiment 6

Figure 21:
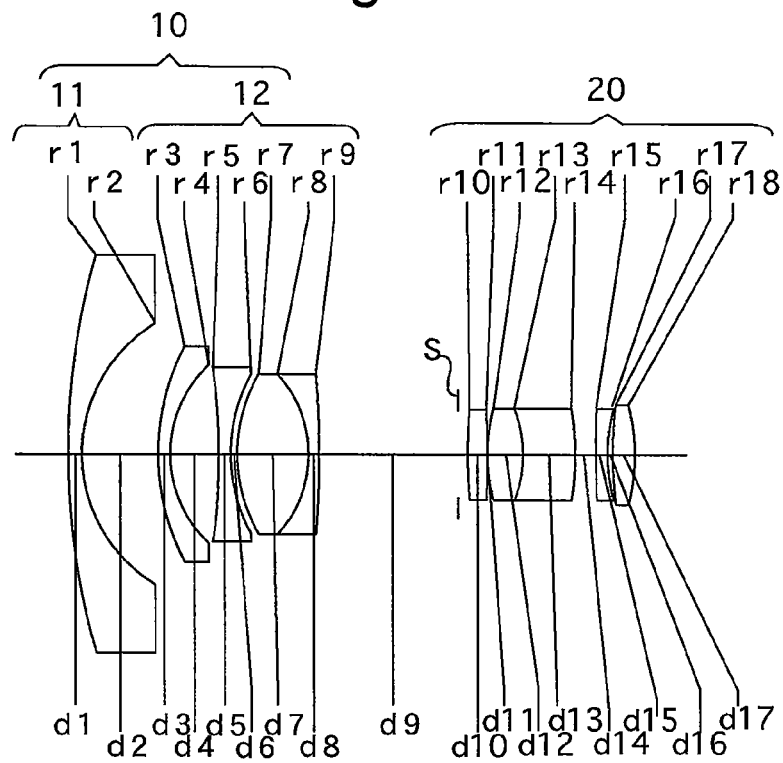
FIG. 21 is a lens arrangement of the fisheye zoom lens system, at the short focal length extremity, according to a sixth embodiment of the present invention.
Figures 22A, 22B, 22C, 22D, 22E:
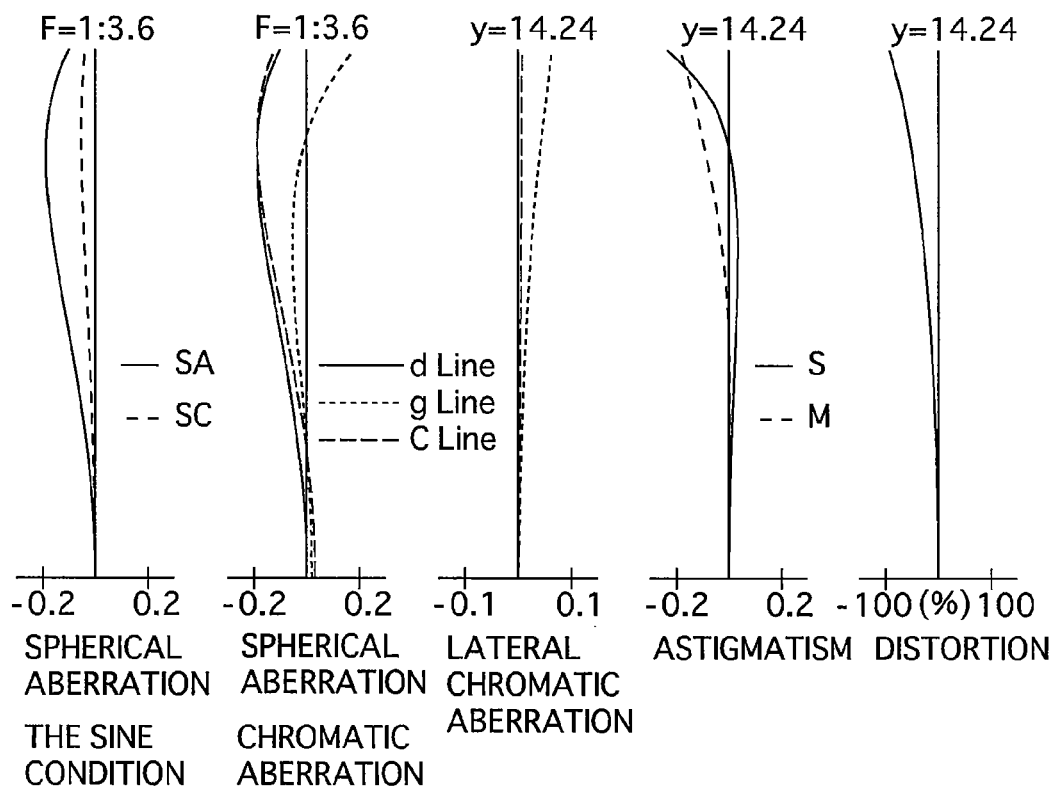
FIGS. 22A, 22B, 22C, 22D and 22E show aberrations occurred, at the short focal length extremity, in the lens arrangement shown in FIG. 21.

FIG. 21 is the lens arrangement of the fisheye zoom lens system, at the short focal length extremity, according to the sixth embodiment of the present invention. FIGS. 22A through 22E show aberrations occurred, at the short focal length extremity, in the lens arrangement shown in FIG. 21. FIGS. 23A through 23E show aberrations occurred, at an intermediate focal length, in the lens arrangement shown in FIG. 21. FIGS. 24A through 24E show aberrations occurred, at the long focal length extremity, in the lens arrangement shown in FIG. 21.

Table 6 shows the numerical data of the sixth embodiment.

The basic lens arrangement of the sixth embodiment is the same as that of the first embodiment.

A diaphragm S is provided 1.20 in front of the positive second lens group 20 (surface No. 10).

TABLE 6

F = 1:3.6-4.2-4.8
f = 10.58-14.00-17.70
W = 87.0-60.1-46.6
fB = 38.50-45.39-52.83

| Surf. No. | r | d | Nd | ν |
|---|---|---|---|---|
| 1 | 92.075 | 1.70 | 1.72916 | 54.7 |
| 2 | 19.511 | 9.59 | — | — |
| 3 | 29.664 | 1.50 | 1.77250 | 49.6 |
| 4 | 15.517 | 6.17 | — | — |
| 5 | −80.325 | 1.50 | 1.80400 | 46.6 |
| 6 | 21.114 | 0.84 | — | — |
| 7 | 20.228 | 9.03 | 1.69895 | 30.1 |
| 8 | −15.000 | 1.29 | 1.80400 | 46.6 |
| 9 | −133.567 | 18.72-11.32-6.54 | — | — |
| 10 | 66.007 | 2.45 | 1.65128 | 38.3 |
| 11 | −140.781 | 0.10 | — | — |
| 12 | 24.278 | 4.48 | 1.49700 | 81.6 |
| 13 | −15.358 | 6.54 | 1.88300 | 40.8 |
| 14 | −37.011 | 2.66 | — | — |
| 15 | 153.531 | 1.50 | 1.80518 | 25.4 |
| 16 | 24.038 | 0.60 | — | — |
| 17 | 52.705 | 2.77 | 1.69680 | 55.5 |
| 18 | −26.623 | — | — | — |

Embodiment 7

Figure 25:
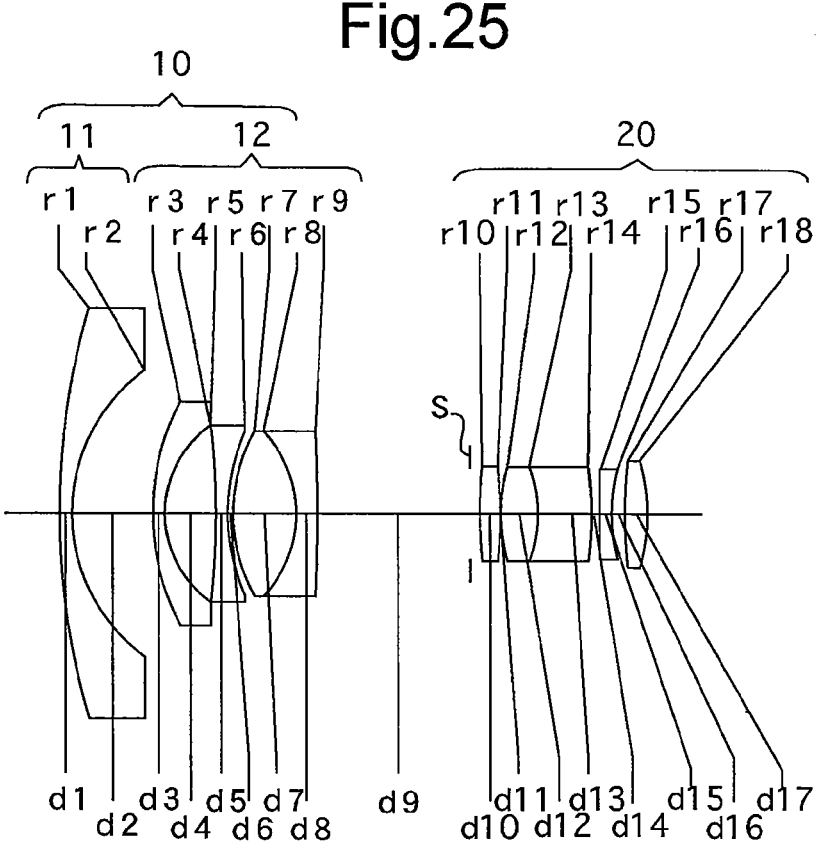
FIG. 25 is a lens arrangement of the fisheye zoom lens system, at the short focal length extremity, according to a seventh embodiment of the present invention.
Figures 26A, 26B, 26C, 26D, 26E:
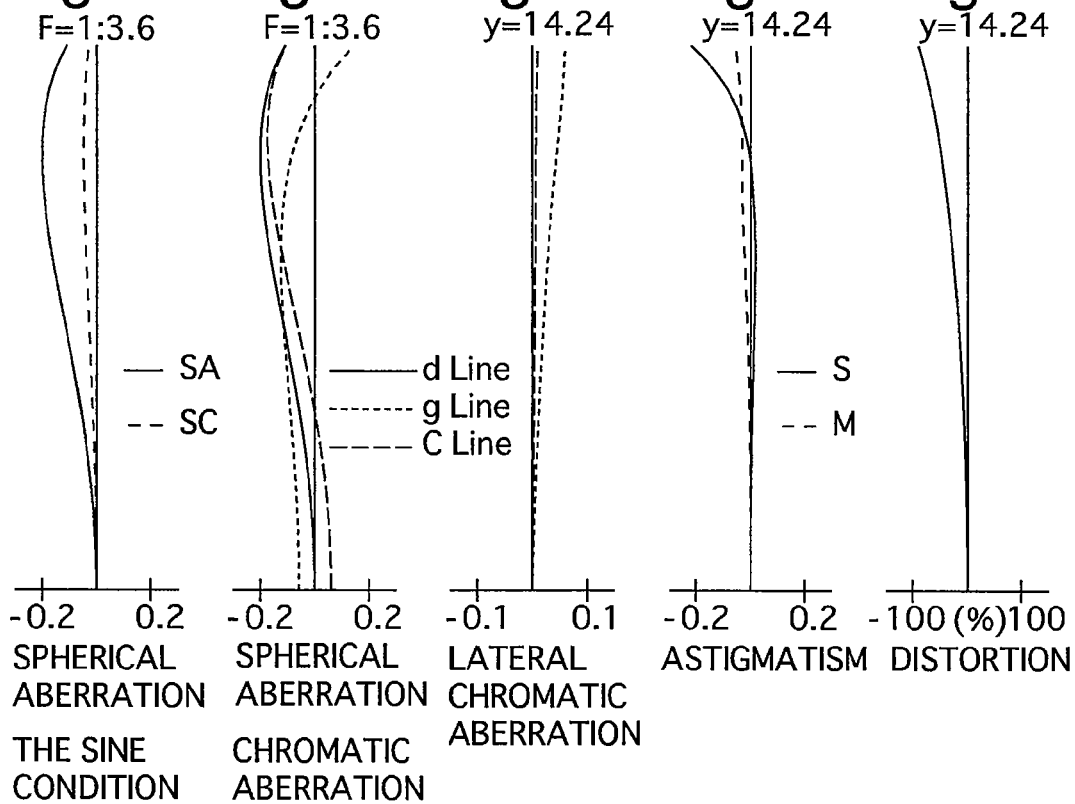
FIGS. 26A, 26B, 26C, 26D and 26E show aberrations occurred, at the short focal length extremity, in the lens arrangement shown in FIG. 25.

FIG. 25 is the lens arrangement of the fisheye zoom lens system, at the short focal length extremity, according to a seventh embodiment of the present invention. FIGS. 26A through 26E show aberrations occurred, at the short focal length extremity, in the lens arrangement shown in FIG. 25. FIGS. 27A through 27E show aberrations occurred, at an intermediate focal length, in the lens arrangement shown in FIG. 25. FIGS. 28A through 28E show aberrations occurred, at the long focal length extremity, in the lens arrangement shown in FIG. 25.

Table 7 shows the numerical data of the seventh embodiment.

The basic lens arrangement of the seventh embodiment is the same as that of the first embodiment.

A diaphragm S is provided 1.20 in front of the positive second lens group 20 (surface No. 10).

TABLE 7

F = 1:3.6-4.2-4.9
f = 10.61-14.00-18.00
W = 85.8-59.9-45.7
fB = 37.08-43.91-51.98

| Surf. No. | r | d | Nd | ν |
|---|---|---|---|---|
| 1 | 89.173 | 1.50 | 1.77250 | 49.6 |
| 2 | 21.887 | 9.86 | — | — |
| 3 | 29.523 | 1.50 | 1.77250 | 49.6 |
| 4 | 13.364 | 6.19 | — | — |
| 5 | −100.706 | 1.50 | 1.80400 | 46.6 |
| 6 | 24.928 | 0.65 | — | — |
| 7 | 20.485 | 7.71 | 1.69895 | 30.1 |
| 8 | −15.000 | 2.58 | 1.80400 | 46.6 |
| 9 | −236.216 | 19.97-12.78-7.78 | — | — |
| 10 | 56.329 | 2.45 | 1.64769 | 33.8 |
| 11 | −61.564 | 0.10 | — | — |
| 12 | 21.705 | 4.48 | 1.48749 | 70.2 |
| 13 | −16.595 | 6.54 | 1.83400 | 37.2 |
| 14 | −45.175 | 0.96 | — | — |
| 15 | 4867.248 | 1.50 | 1.80518 | 25.4 |
| 16 | 21.874 | 1.65 | — | — |
| 17 | 61.229 | 2.77 | 1.65160 | 58.5 |
| 18 | −23.031 | — | — | — |

Embodiment 8

Figure 29:
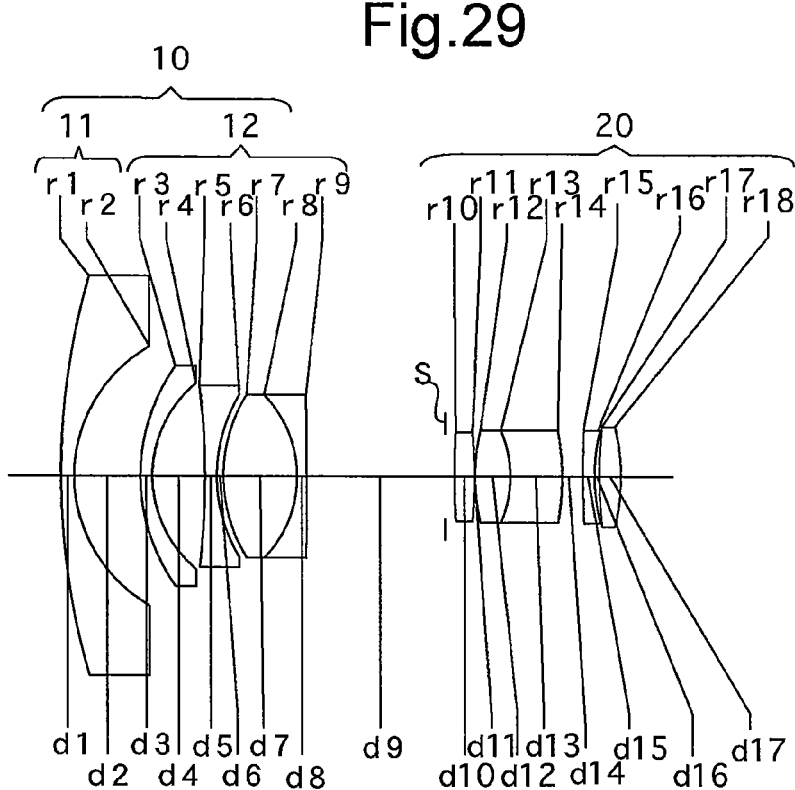
FIG. 29 is a lens arrangement of the fisheye zoom lens system, at the short focal length extremity, according to an eighth embodiment of the present invention.
Figures 30A, 30B, 30C, 30D, 30E:
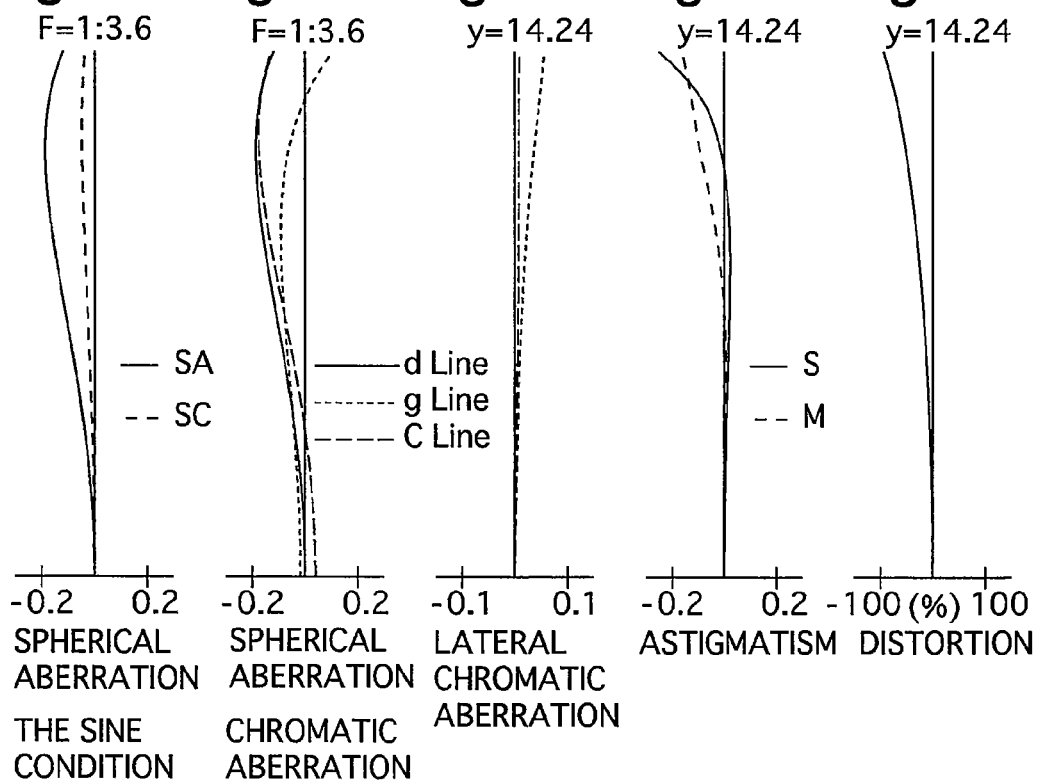
FIGS. 30A, 30B, 30C, 30D and 30E show aberrations occurred, at the short focal length extremity, in the lens arrangement shown in FIG. 29.

FIG. 29 is the lens arrangement of the fisheye zoom lens system, at the short focal length extremity, according to an eighth embodiment of the present invention. FIGS. 30A through 30E show aberrations occurred, at the short focal length extremity, in the lens arrangement shown in FIG. 29. FIGS. 31A through 31E show aberrations occurred, at an intermediate focal length, in the lens arrangement shown in FIG. 29. FIGS. 32A through 32E show aberrations occurred, at the long focal length extremity, in the lens arrangement shown in FIG. 29.

Table 8 shows the numerical data of the eighth embodiment.

The basic lens arrangement of the eighth embodiment is the same as that of the first embodiment.

A diaphragm S is provided 1.20 in front of the positive second lens group 20 (surface No. 10).

TABLE 8

F = 1:3.6-4.2-4.8
f = 10.71-14.00-17.70
W = 87.2-60.6-46.8
fB = 39.00-45.65-53.14

| Surf. No. | r | d | Nd | ν |
|---|---|---|---|---|
| 1 | 91.097 | 1.70 | 1.72916 | 54.7 |
| 2 | 19.094 | 8.37 | — | — |
| 3 | 24.296 | 1.50 | 1.77250 | 49.6 |
| 4 | 15.375 | 6.67 | — | — |
| 5 | −102.618 | 1.50 | 1.80400 | 46.6 |
| 6 | 20.055 | 0.84 | — | — |
| 7 | 19.572 | 9.39 | 1.69895 | 30.1 |
| 8 | −15.000 | 1.20 | 1.80400 | 46.6 |
| 9 | −775.094 | 18.79-11.97-7.33 | — | — |
| 10 | 107.747 | 2.45 | 1.65128 | 38.3 |
| 11 | −76.232 | 0.10 | — | — |
| 12 | 25.406 | 4.48 | 1.49700 | 81.6 |
| 13 | −15.138 | 6.54 | 1.88300 | 40.8 |
| 14 | −35.872 | 2.70 | — | — |
| 15 | 159.879 | 1.50 | 1.80518 | 25.4 |
| 16 | 25.759 | 0.60 | — | — |
| 17 | 58.471 | 2.77 | 1.69680 | 55.5 |
| 18 | −26.477 | — | — | — |

Embodiment 9

FIG. 33 is the lens arrangement of the fisheye zoom lens system, at the short focal length extremity, according to the ninth embodiment of the present invention. FIGS. 34A through 34E show aberrations occurred, at the short focal length extremity, in the lens arrangement shown in FIG. 33. FIGS. 35A through 35E show aberrations occurred, at an intermediate focal length, in the lens arrangement shown in FIG. 33. FIGS. 36A through 36E show aberrations occurred, at the long focal length extremity, in the lens arrangement shown in FIG. 33.

Table 9 shows the numerical data of the ninth embodiment.

The basic lens arrangement of the ninth embodiment is the same as that of the first embodiment.

A diaphragm S is provided 1.50 behind surface No. 11 in the positive second lens group 20.

TABLE 9

F = 1:3.6-3.8-4.6
f = 10.36-12.00-16.50
W = 86.2-71.0-49.9
fB = 39.63-43.26-53.19

| Surf. No. | r | d | Nd | ν |
|---|---|---|---|---|
| 1 | 80.388 | 1.90 | 1.69680 | 55.5 |
| 2 | 21.000 | 10.88 | — | — |
| 3 | 64.000 | 1.50 | 1.77250 | 49.6 |
| 4 | 15.117 | 7.40 | — | — |
| 5 | −141.500 | 1.50 | 1.88300 | 40.8 |
| 6 | 24.330 | 0.70 | — | — |
| 7 | 21.400 | 9.70 | 1.71736 | 29.5 |
| 8 | −15.898 | 1.50 | 1.88300 | 40.8 |
| 9 | −76.530 | 13.60-9.32-1.96 | — | — |
| 10 | 44.435 | 7.00 | 1.66998 | 39.3 |
| 11 | −430.160 | 3.00 | — | — |
| 12 | 33.600 | 7.44 | 1.49700 | 81.6 |
| 13 | −11.780 | 2.81 | 1.88300 | 40.8 |
| 14 | −28.090 | 1.00 | — | — |
| 15 | 185.512 | 2.98 | 1.76182 | 26.5 |
| 16 | 33.660 | 0.45 | — | — |
| 17 | 85.000 | 2.97 | 1.69680 | 55.5 |
| 18 | −20.382 | — | — | — |

Embodiment 10

FIG. 37 is the lens arrangement of the fisheye zoom lens system, at the short focal length extremity, according to the tenth embodiment of the present invention. FIGS. 38A through 38E show aberrations occurred, at the short focal length extremity, in the lens arrangement shown in FIG. 37. FIGS. 39A through 39E show aberrations occurred, at an intermediate focal length, in the lens arrangement shown in FIG. 37. FIGS. 40A through 40E show aberrations occurred, at the long focal length extremity, in the lens arrangement shown in FIG. 37.

Table 10 shows the numerical data of the tenth embodiment.

The basic lens arrangement of the tenth embodiment is the same as that of the first embodiment.

A diaphragm S is provided 1.50 behind surface No. 11 in the positive second lens group 20.

TABLE 10

F = 1:3.7-4.0-4.8
f = 9.98-12.00-16.10
W = 89.0-71.1-51.2
fB = 38.77-43.26-52.39

| Surf. No. | r | d | Nd | ν |
|---|---|---|---|---|
| 1 | 83.396 | 1.90 | 1.72916 | 54.7 |
| 2 | 21.000 | 12.12 | — | — |
| 3 | 102.623 | 1.50 | 1.77250 | 49.6 |
| 4 | 17.729 | 9.80 | — | — |
| 5 | −832.968 | 1.50 | 1.88300 | 40.8 |
| 6 | 22.738 | 0.75 | — | — |
| 7 | 21.045 | 10.00 | 1.71736 | 29.5 |
| 8 | −16.717 | 1.50 | 1.88300 | 40.8 |
| 9 | −96.283 | 16.27-10.74-3.79 | — | — |
| 10 | 40.580 | 6.88 | 1.66998 | 39.3 |
| 11 | −921.183 | 3.00 | — | — |
| 12 | 23.503 | 6.12 | 1.49700 | 81.6 |
| 13 | −14.577 | 2.80 | 1.88300 | 40.8 |
| 14 | −43.338 | 1.00 | — | — |
| 15 | 264.137 | 1.50 | 1.80518 | 25.4 |
| 16 | 25.756 | 0.75 | — | — |
| 17 | 77.383 | 2.71 | 1.69680 | 55.5 |
| 18 | −22.827 | — | — | — |

The numerical values of each condition of each embodiment are shown in Table 11.

TABLE 11

| | Embod. 1 | Embod. 2 | Embod. 3 | Embod. 4 | Embod. 5 |
|---|---|---|---|---|---|
| Cond. (1) | 0.59 | 0.59 | 0.59 | 0.58 | 0.60 |
| Cond. (2) | 0.46 | 0.51 | 0.64 | 0.38 | 0.40 |
| Cond. (3) | 1.22 | 1.10 | 1.22 | 1.02 | 1.59 |
| Cond. (4) | 81.6 | 81.6 | 81.6 | 81.6 | 81.6 |
| Cond. (5) | 1.21 | 1.13 | 1.13 | 0.58 | 1.00 |
| Cond. (6) | 1.60 | 1.70 | 1.74 | 1.71 | 1.74 |
| Cond. (7) | 0.45 | 0.40 | 0.27 | 0.60 | 0.63 |
| Cond. (8) | 1.21 | 1.61 | 1.68 | 1.74 | 1.51 |

| | Embod. 6 | Embod. 7 | Embod. 8 | Embod. 9 | Embod. 10 |
|---|---|---|---|---|---|
| Cond. (1) | 0.65 | 0.61 | 0.65 | 0.59 | 0.60 |
| Cond. (2) | 0.31 | 0.38 | 0.22 | 0.62 | 0.71 |
| Cond. (3) | 1.71 | 1.66 | 1.49 | 1.42 | 1.06 |
| Cond. (4) | 81.6 | 70.2 | 81.6 | 81.6 | 81.6 |
| Cond. (5) | 0.91 | 0.93 | 0.78 | 1.05 | 1.21 |
| Cond. (6) | 1.55 | 1.75 | 1.54 | 1.73 | 1.73 |
| Cond. (7) | 0.66 | 0.74 | 0.79 | 0.33 | 0.204 |
| Cond. (8) | 1.26 | 1.54 | 1.21 | 1.88 | 1.65 |

As can be understood from Table 11, the first through tenth embodiments satisfy conditions (1) through (5). Furthermore, as can be understood from the aberration diagrams, lateral chromatic aberration and various other aberrations are adequately corrected.

According to the description, a miniaturized fisheye lens system and a miniaturized fisheye zoom lens system, both of which are suitable for a digital camera, can attain the following features:

(i) a back focal distance which is substantially the same as that of a camera of the 135 (35 mm) film format;

(ii) a smaller image-plane size compared with the image-plane size for the 135 (35 mm) film format; and (iii) suitably correcting aberrations including lateral chromatic aberration.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A fisheye lens system comprising a negative first lens group and a positive second lens group, in this order from an object,
wherein said negative first lens group and said positive second lens group are defined with respect to a maximum air-distance between lens elements constituting said fisheye lens system;
wherein said negative first lens group comprises a first negative meniscus lens element having the convex surface facing toward the object, a second negative meniscus lens element having the convex surface facing toward the object, and a negative third lens element, in this order from the object; and
wherein said fisheye lens system satisfies the following conditions:

$$0.25 < SF1 \leq 1.0$$

$$0.1 < SF2 \leq 1.0$$

$$0.9 < SF3 < 2.1$$

wherein
SF1 designates the shaping factor of said first negative meniscus lens element (SF1=(r1−r2)/(r1+r2));
r1 designates the radius of curvature of the object-side surface of said first negative meniscus lens element;
r2 designates the radius of curvature of the image-side surface of said first negative meniscus lens element;
SF2 designates the shaping factor of said second negative meniscus lens element (SF2=(r3−r4)/(r3+r4));
r3 designates the radius of curvature of the object-side surface of said second negative meniscus lens element;
r4 designates the radius of curvature of the image-side surface of said second negative meniscus lens element;
SF3 designates the shaping factor of said negative third lens element (SF3=(r5−r6)/(r5+r6));
r5 designates the radius of curvature of the object-side surface of said negative third lens element; and
r6 designates the radius of curvature of the image-side surface of said negative third lens element.

2. The fisheye lens system according to claim 1, wherein said negative first lens group further comprises positive cemented lens elements comprising a biconvex positive lens element and a biconcave negative lens element, and
wherein said positive cemented lens elements are provided on the image side of said negative third lens element.

3. The fisheye lens system according to claim 1, wherein said positive second lens group comprises a positive lens element satisfying the following condition:

$$70 < \nu 2p$$

wherein
ν2p designates the Abbe number of said positive lens element in said positive second lens group.

4. The fisheye lens system according to claim 1, wherein focusing is performed by said second negative meniscus lens element and lens elements provided therebehind in said negative first lens group, while said first negative meniscus lens element is made immovable.

5. The fisheye lens system according to claim 4, satisfying the following condition:

$$0.5 < D_{(1a-1b)}/fw < 1.5$$

wherein $D_{(1a-1b)}$ designates an air-distance between said first negative meniscus lens element and said second negative meniscus lens element; and fw designates the focal length of said entire the fisheye lens system.

6. The fisheye lens system according to claim 4, satisfying the following conditions:

$$1.4 < |r2/f1| < 2.0 \, (f1<0)$$

$$0.2 < r2/r3 < 0.8 \, (r2, r3 > 0)$$

$$1.0 < f1a/f1b < 2.0 \, (f1a, f1b < 0)$$

wherein r2 designates the radius of curvature of the image-side surface of said (the most object-side) first negative meniscus lens element in said negative first lens group;

f1 designates the focal length of the negative first lens group;

r3 designates the radius of curvature of the object-side surface of said second negative meniscus lens element which is the second lens element from the object in said negative first lens group;

f1a designates the focal length of said first negative meniscus lens element in said negative first lens group; and f1b designates the combined focal length of said second negative meniscus lens element and lens elements therebehind in said negative first lens group.

7. The fisheye lens system according to claim 1, wherein said fisheye lens system is applied to a fisheye zoom lens system in which a position where the air-distance between said negative first lens group and said positive second lens group becomes maximum is set to be the short focal length extremity, wherein for zooming from the short focal length extremity, said negative first lens group is arranged to first move to an image, and then move to the object, and said positive second lens group is arranged to monotonically move toward the object.

* * * * *